United States Patent
Takahashi et al.

(10) Patent No.: US 10,505,406 B2
(45) Date of Patent: Dec. 10, 2019

(54) SKEWED STATOR CORES FOR IMPROVED TORQUE AND EFFICIENCY

(71) Applicants: Kabushiki Kaisha Toshiba, Minato-ku (JP); Toshiba Industrial Products and Systems Corporation, Kawasaki-shi (JP)

(72) Inventors: Hiroshi Takahashi, Yokohama (JP); Yasuhito Ueda, Yokohama (JP); Takahiro Kokubo, Kamakura (JP); Toyonobu Yamada, Mie (JP); Yoshiro Shinoda, Mie (JP); Hisaaki Shimozu, Mie (JP); Yuji Yamamoto, Mie (JP)

(73) Assignees: Kabushiki Kaisha Toshiba, Minato-ku (JP); Toshiba Industrial Products and Systems Corporation, Kawasaki-shi (JP)

( * ) Notice: Subject to any disclaimer, the term of this patent is extended or adjusted under 35 U.S.C. 154(b) by 178 days.

(21) Appl. No.: 15/062,613

(22) Filed: Mar. 7, 2016

(65) Prior Publication Data

US 2016/0276881 A1 Sep. 22, 2016

(30) Foreign Application Priority Data

Mar. 20, 2015 (JP) ................................ 2015-058300

(51) Int. Cl.
*H02K 37/14* (2006.01)
*H02K 1/14* (2006.01)
(Continued)

(52) U.S. Cl.
CPC ............ *H02K 1/148* (2013.01); *H02K 1/145* (2013.01); *H02K 1/185* (2013.01); *H02K 37/14* (2013.01);
(Continued)

(58) Field of Classification Search
CPC ............ H02K 1/12; H02K 1/14; H02K 1/141; H02K 1/143; H02K 1/145; H02K 1/146;
(Continued)

(56) References Cited

U.S. PATENT DOCUMENTS 4,616,151 A * 10/1986 Pryjmak .................. H02K 1/26
  310/216.012
6,229,238 B1 5/2001 Graef
(Continued)

FOREIGN PATENT DOCUMENTS

JP 48-88909 U 10/1973
JP 8-205437 A 8/1996
(Continued)

*Primary Examiner* — Mang Tin Bik Lian
*Assistant Examiner* — Alexander A Singh
(74) *Attorney, Agent, or Firm* — Oblon, McClelland, Maier & Neustadt, L.L.P.

(57) ABSTRACT

According to one embodiment, an electrical machine includes a rotor and an armature. The armature includes first to third stator cores, and an armature coil. The first and second stator cores are arranged along a direction of a rotation axis of the rotor. The third stator core is arranged opposite to the first and second stator cores. The armature coil is provided between the first and second stator cores. The first and second stator cores have a same shape and each include magnetic poles and a first positioning part. The third stator core includes a second positioning part. A relative phase angle of the first stator core and a relative phase angle of the second stator core in the rotation direction are set by using the first positioning part and the second positioning part.

20 Claims, 19 Drawing Sheets

(51) Int. Cl.
 *H02K 1/18* (2006.01)
 *B66B 11/04* (2006.01)
(52) U.S. Cl.
 CPC ........ *B66B 11/043* (2013.01); *H02K 2201/06* (2013.01)
(58) Field of Classification Search
 CPC ........ H02K 1/148; H02K 1/185; H02K 37/14; H02K 2201/06; H02K 3/525; H02K 21/125; H02K 21/145; B66B 11/043
 USPC .... 310/216.009, 216.011, 216.012, 216.016, 310/216.086, 216.127, 164
 See application file for complete search history.

(56) References Cited

U.S. PATENT DOCUMENTS

| | | | | |
|---|---|---|---|---|
| 2004/0124734 | A1* | 7/2004 | Liao | H02K 1/148 310/254.1 |
| 2005/0062352 | A1 | 3/2005 | Kastinger | |
| 2005/0212381 | A1 | 9/2005 | Gilmour et al. | |
| 2008/0211326 | A1* | 9/2008 | Kang | H02K 21/145 310/44 |
| 2009/0026872 | A1* | 1/2009 | Tomohara | H02K 1/148 310/216.011 |
| 2011/0121680 | A1* | 5/2011 | Boardman, IV | H02K 1/185 310/216.129 |
| 2015/0091403 | A1 | 4/2015 | Ueda | |
| 2016/0265944 | A1* | 9/2016 | Takiguchi | G01D 5/2046 |

FOREIGN PATENT DOCUMENTS

| | | |
|---|---|---|
| JP | 2006-509488 | 3/2006 |
| JP | 4085059 | 4/2008 |
| JP | 2008-167646 A | 7/2008 |
| JP | 2011-109907 A | 6/2011 |
| JP | 4743718 | 8/2011 |
| JP | 2014-75900 A | 4/2014 |
| JP | 2015-70767 | 4/2015 |
| KR | 10-2004-0045734 A | 6/2004 |

* cited by examiner

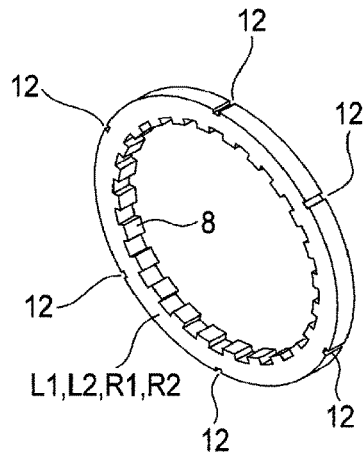
FIG. 4
| | L1 | L2 | R1 | R2 |
|---|---|---|---|---|
| U phase | UL1=0 | UL2=1.25 | UR1=0 | UR2=1.25 |
| V phase | VL1=5 | VL2=6.25 | VR1=5 | VR2=6.25 |
| W phase | WL1=10 | WL2=11.25 | WR1=10 | WR2=11.25 |
Unit: deg
FIG. 5
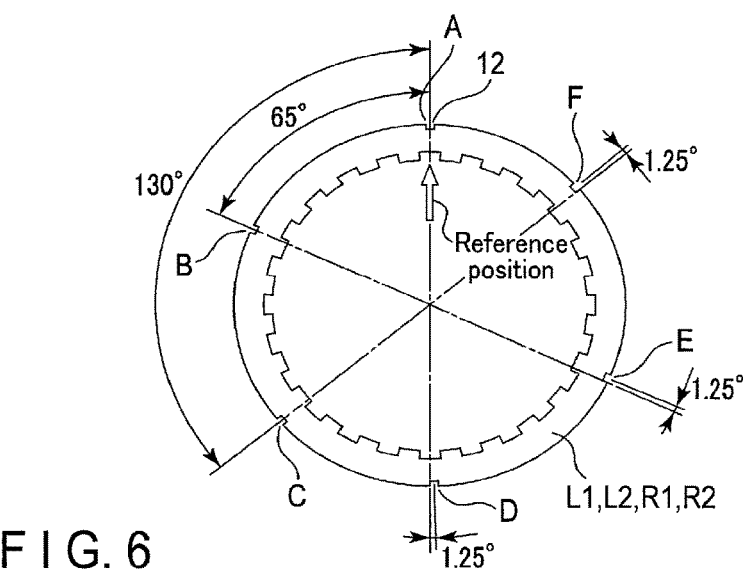
FIG. 6

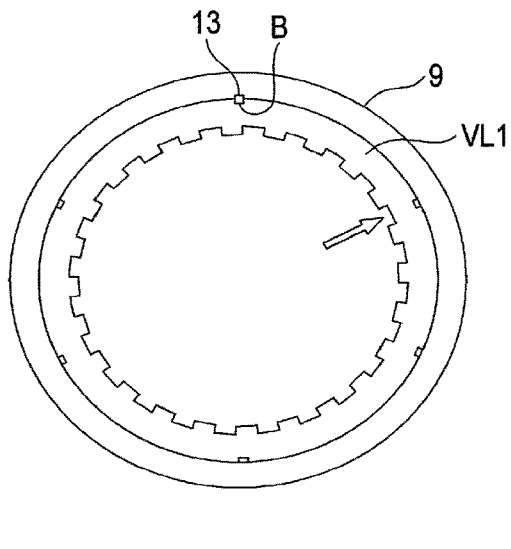
F I G. 8A
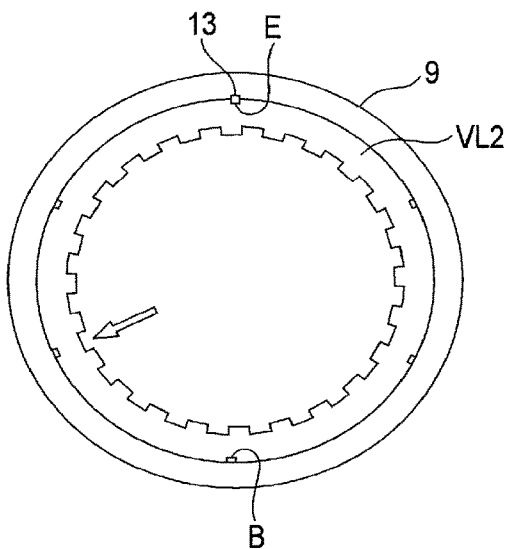
F I G. 8B
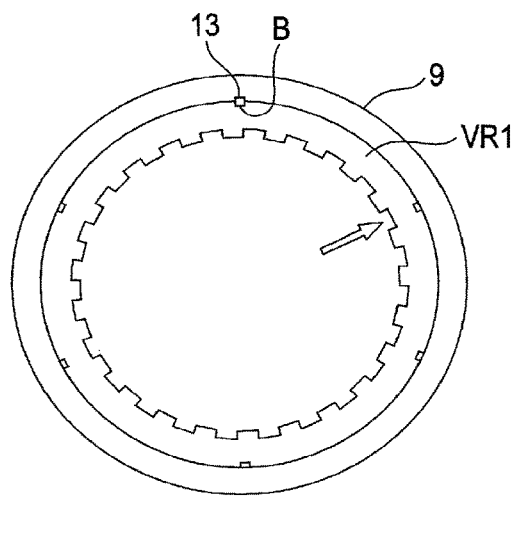
F I G. 8C
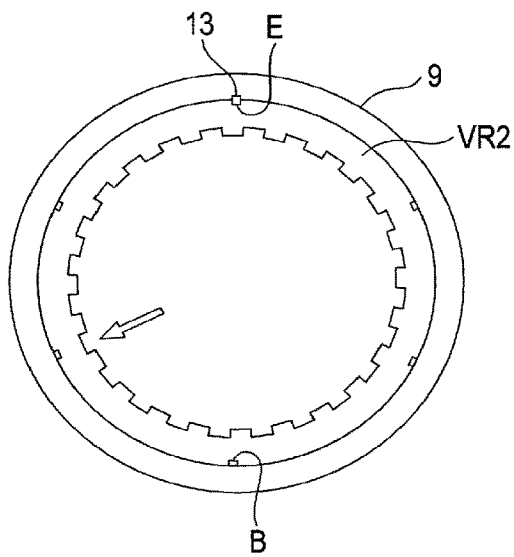
F I G. 8D

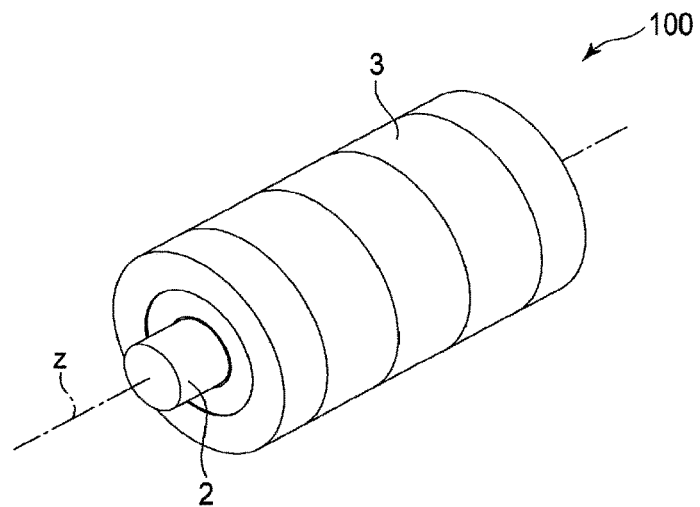
F I G. 10
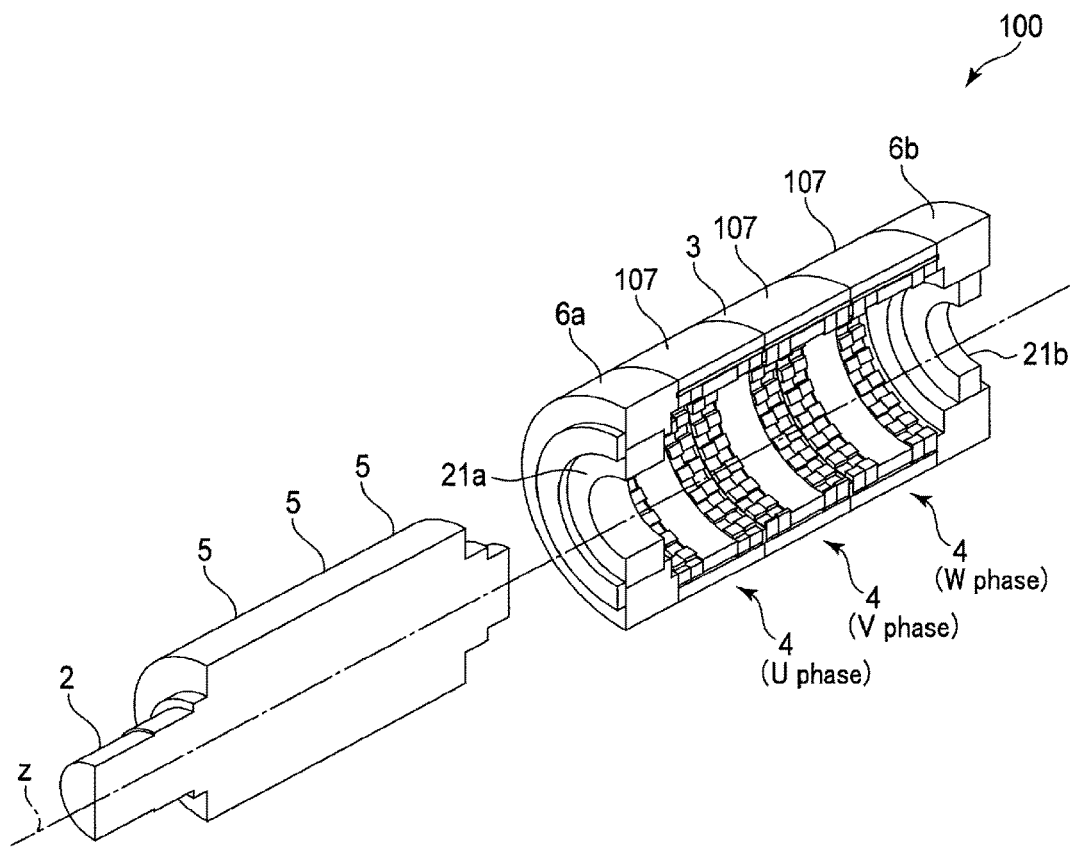
F I G. 11

| | | | | Unit: deg |
|---|---|---|---|---|
| | L1a | L2a | R1a | R2a |
| U phase | UL1a=0 | UL2a=1.25 | UR1a=1.25 | UR2a=2.5 |
| V phase | VL1a=5 | VL2a=6.25 | VR1a=6.25 | VR2a=7.5 |
| W phase | WL1a=10 | WL2a=11.25 | WR1a=11.25 | WR2a=12.5 |

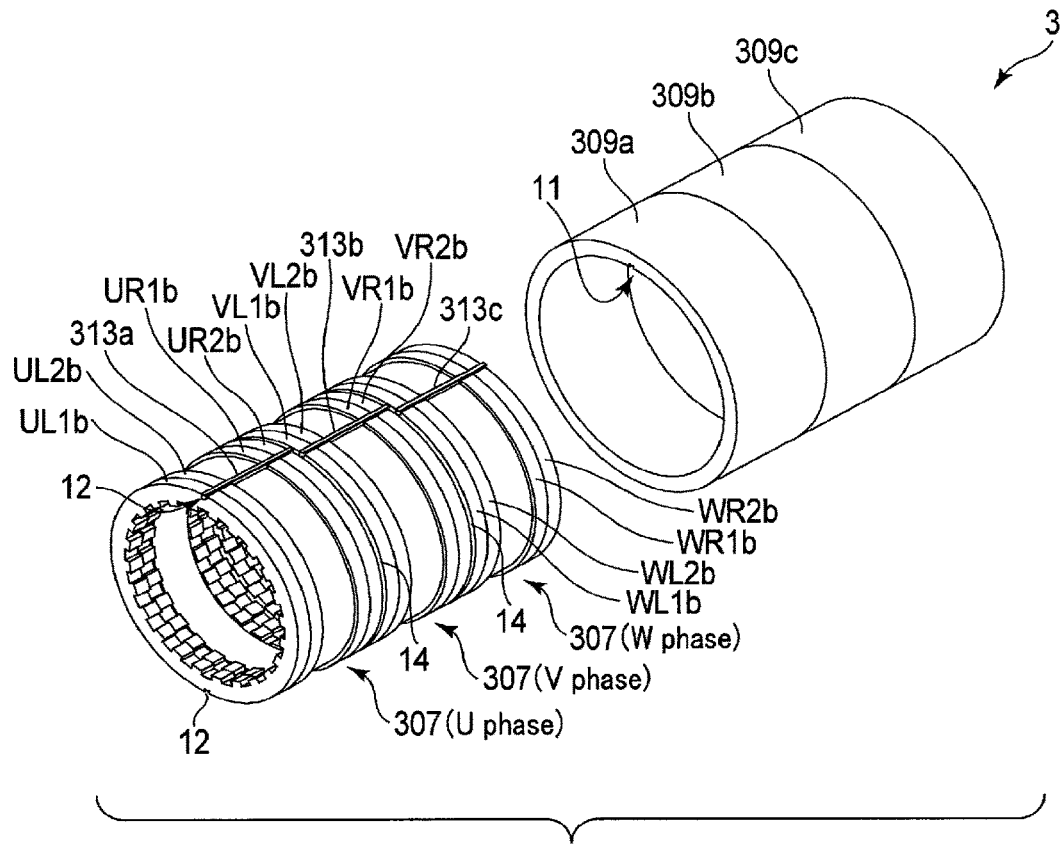
F I G. 16
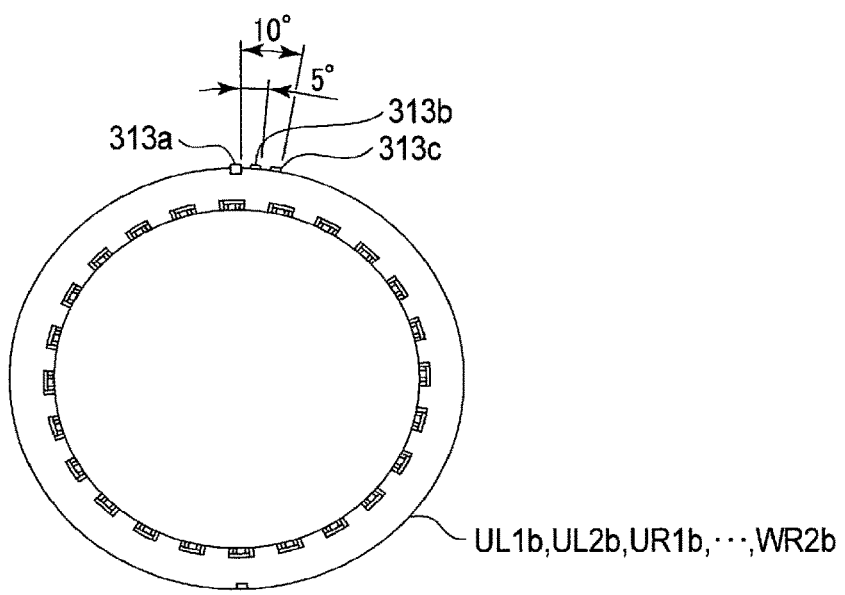
F I G. 17

| | L1c | L2c | L3c | R1c | R2c | R3c |
|---|---|---|---|---|---|---|
| U phase | UL1c=0 | UL2c=0.83 | UL3c=1.67 | UR1c=1.25 | UR2c=2.08 | UR3c=2.92 |
| V phase | VL1c=5 | VL2c=5.83 | VL3c=6.67 | VR1c=6.25 | VR2c=7.08 | VR3c=7.92 |
| W phase | WL1c=10 | WL2c=10.83 | WL3c=11.67 | WR1c=11.25 | WR2c=12.08 | WR3c=12.92 |

Unit: deg

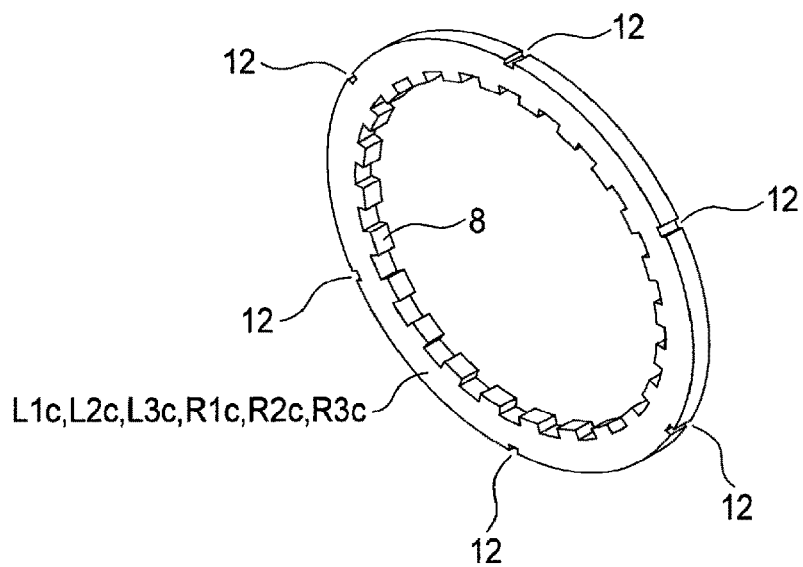
F I G. 21A
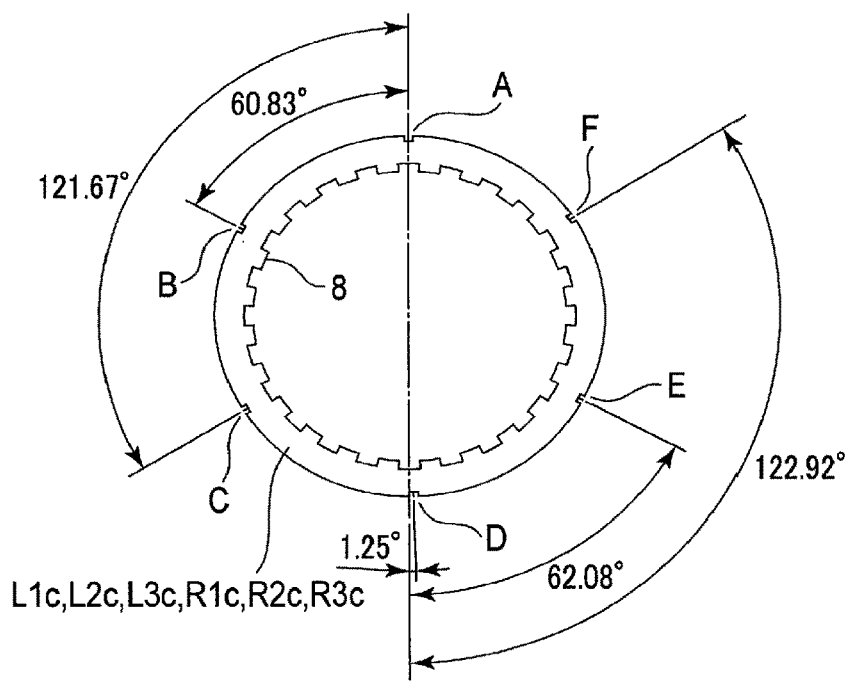
F I G. 21B

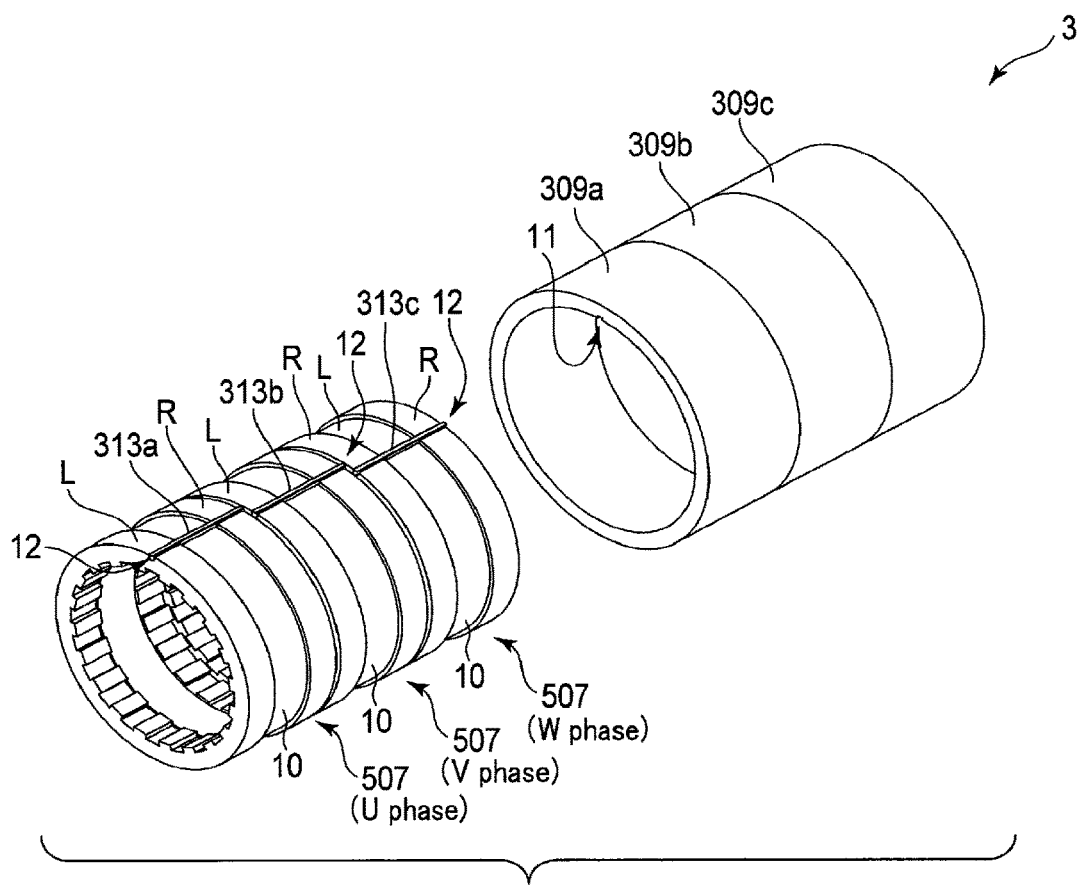
F I G. 22
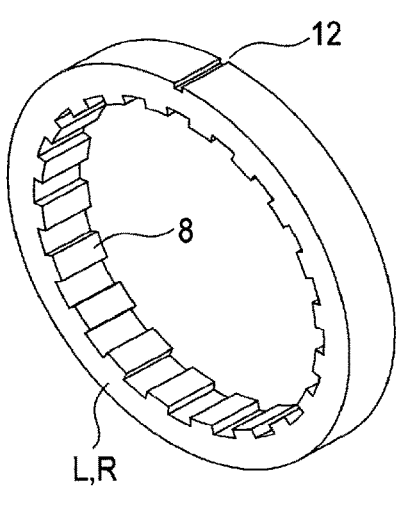
F I G. 23A
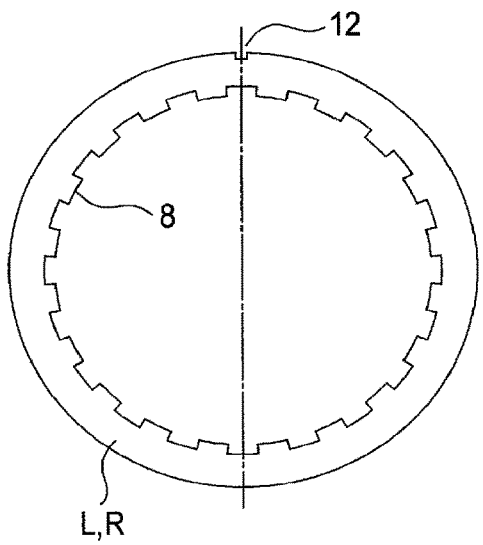
F I G. 23B

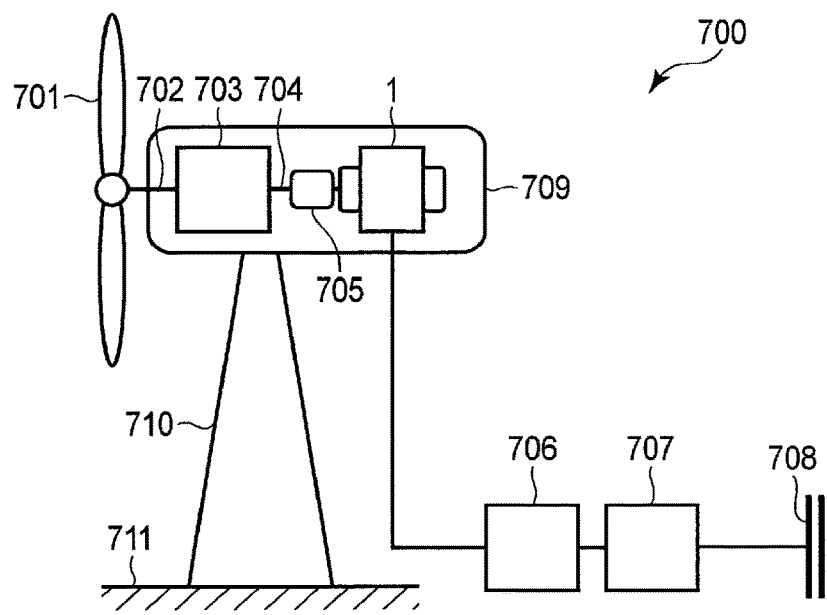
F I G. 27
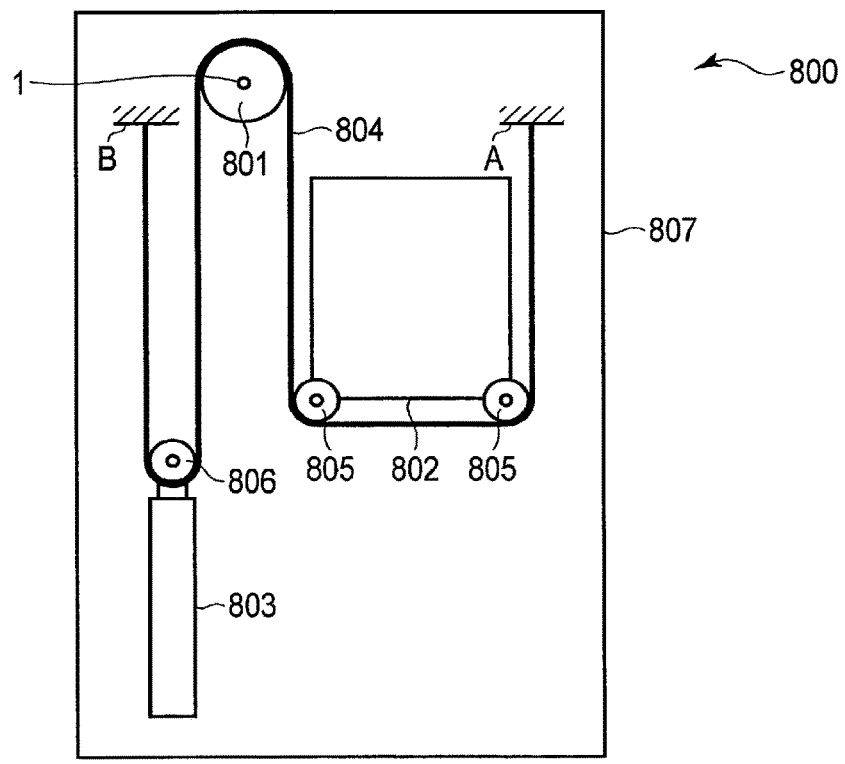
F I G. 28

SKEWED STATOR CORES FOR IMPROVED TORQUE AND EFFICIENCY

CROSS-REFERENCE TO RELATED APPLICATIONS

This application is based upon and claims the benefit of priority from prior Japanese Patent Application No. 2015-058300, filed Mar. 20, 2015, the entire contents of which are incorporated herein by reference.

FIELD

Embodiments described herein relate generally to an electrical machine and a hoisting machine.

BACKGROUND

For the purpose of saving energy, reducing $CO_2$ emissions and the like, electromagnetic motors call for higher performance, such as size and weight reduction, high efficiency, high torque and high output power, and the performance is dramatically improving day to day.

Electromagnetic motors can be roughly classified into (1) radial flux motors, (2) axial flux motors, (3) and transversal flux motors, according to the direction of magnetic flux. Of these flux motors, the radial flux motor is particularly excellent in cost performance and has conventionally been used widely in a variety of products in industry as a typical machine element of a versatile actuator. The axial flux motor has a structural feature that it can be adapted to complex three-dimensional magnetic paths, but laminated steel plates which are conventionally widely used are hard to use for it. The axial flux motor is used as, in particular, a medium/large-size thin motor of a large bore diameter.

The transversal flux motor has the following structural feature. It includes a rotor and an armature (having a split toroidal core structure) as basic units. The rotor includes permanent magnets. The armature includes a toroidal coil formed around the rotation axis of the rotor and a plurality of substantially U-shaped stator cores (referred to as U-shaped stator cores hereinafter) which are provided circumferentially around the rotation axis to surround the toroidal coil. Two or more basic units are provided on the rotation axis and with a given relative phase angle around the rotation axis. With this structural feature, high torque can be achieved by the multi-polarity and a high-efficiency magnetic field can be generated relatively easily by the split toroidal core structure. In other words, in general, the transversal flux motor can be easily made to have multi-polarity since it is sufficient if a plurality of U-shaped stator cores are circumferentially arranged around the rotation axis, compared to the radial flux motor and the axial flux motor which needs a dead space for, for example, assembling and inserting a stator core with a plurality of slots arranged around the rotation axis, and a coil wound on the slot portions. Furthermore, the armature including a toroidal coil and U-shaped stator cores has a structure that makes it hard for magnetic flux to leak from the coil to the outside, thus increasing the efficiency of generation of a magnetic field due to the coil. Therefore, the transversal flux motor can be expected to be smaller than the radial flux motor and the axial flux motor.

Reduction in manufacturing costs has been demanded of electrical machines.

BRIEF DESCRIPTION OF THE DRAWING

FIG. 4 is a perspective view showing a stator core (teeth portion) according to the first embodiment.

FIG. 5 is a table showing an example of setting a rotation direction phase angle in the electrical machine shown in FIG. 1.

FIG. 6 is an illustration of a position of the stator core shown in FIG. 4, in which a key groove is formed.

FIGS. 8A, 8B, 8C and 8D are illustrations of a method for positioning a V-phase stator core.

FIG. 10 is a perspective view showing an electrical machine according to a second embodiment.

FIG. 11 is an exploded perspective view of the electrical machine shown in FIG. 10.

FIG. 16 is an exploded perspective view of a stator unit according to a fourth embodiment.

FIG. 17 is a front view showing an arrangement of armatures according to the fourth embodiment.

FIG. 21A is a perspective view showing a stator core (teeth portion) according to the fifth embodiment.

FIG. 21B is a front view of the stator core shown in FIG. 21A.

FIG. 22 is an exploded perspective view of a stator unit according to a sixth embodiment.

FIG. 23A is a perspective view showing a stator core (teeth portion) according to the sixth embodiment.

FIG. 23B is a front view of the stator core shown in FIG. 23A.

FIG. 27 is a view showing a wind power generation apparatus according to an eighth embodiment.

FIG. 28 is a view showing an elevator apparatus according to a ninth embodiment.

DETAILED DESCRIPTION

Figure 1:
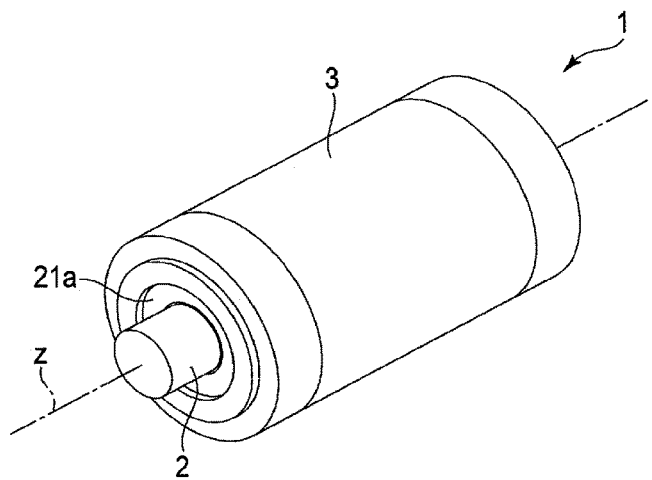
FIG. 1 is a perspective view showing an electrical machine according to a first embodiment.

According to one embodiment, an electrical machine includes a rotor and an armature. The armature includes a first stator core, a second stator core, a third stator core, and an armature coil which are annular in shape. The first stator core and the second stator core are arranged along a direction of a rotation axis of the rotor. The third stator core is arranged opposite to the first stator core and the second stator core. The armature coil is provided between the first stator core and the second stator core. The first stator core and the second stator core have a same shape and each include a plurality of magnetic poles arranged in a rotation direction and a first positioning part opposed to the third stator core. The third stator core includes a second positioning part opposed to the first stator core and the second stator core. A relative phase angle of the first stator core and a relative phase angle of the second stator core in the rotation direction are set by using the first positioning part and the second positioning part.

Embodiments will be described below with reference to the accompanying drawings. The electrical machine according to each of the embodiments is a transverse flux machine (transversal flux motor) in which a magnetic path is generated along the direction of a rotation axis. Throughout the following embodiments, like elements are denoted by like reference numerals and duplication of explanation will be omitted as appropriate.

First Embodiment

Figure 2:
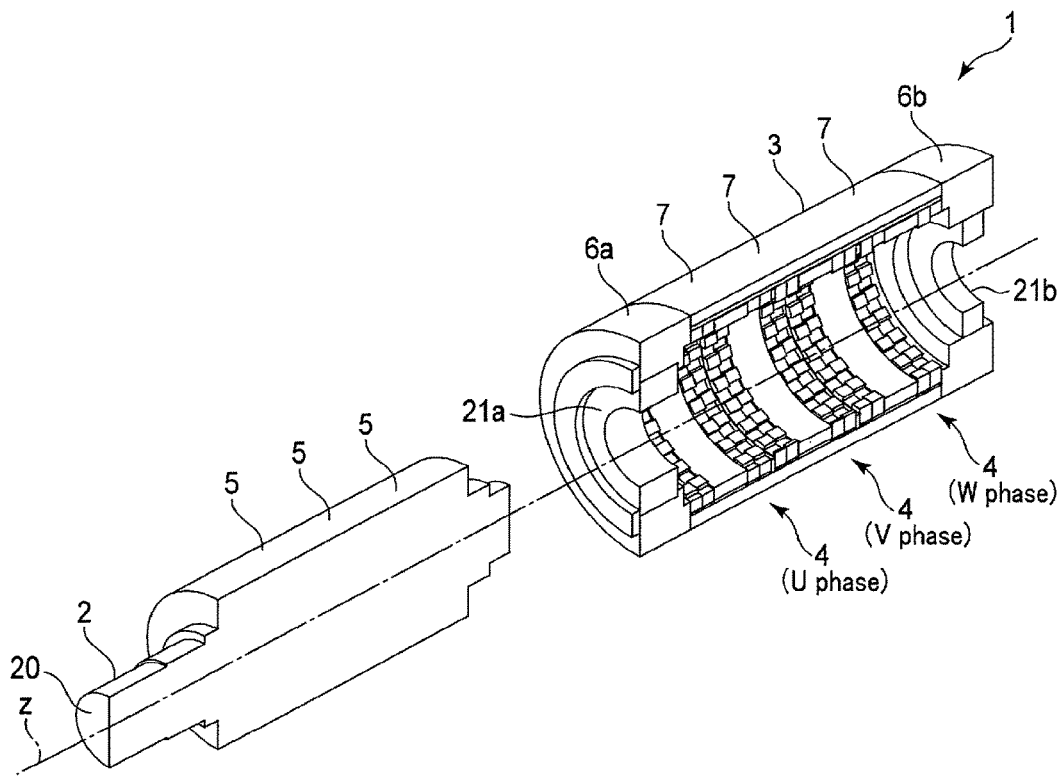
FIG. 2 is an exploded cross-sectional perspective view of the electrical machine shown in FIG. 1.

FIG. 1 is a perspective view schematically showing an electrical machine 1 according to a first embodiment. FIG. 2 is an exploded cross-sectional perspective view of the electrical machine 1. As shown in FIGS. 1 and 2, the electrical machine 1 includes a rotor unit 2 which is supported by bearings 21a and 21b such that it can rotate about a rotation axis z and a stator unit 3 which is provided opposite to the outer surface of the rotor unit 2 with a given gap therebetween. The rotor unit 2 has a substantially cylindrical shape with the rotation axis z at the center thereof. The stator unit 3 also has a substantially cylindrical shape and is coaxially provided to surround the rotor unit 2.

The electrical machine 1 is a three-stage (three-phase) electrical machine in which three basic units 4 are arranged along the direction of the rotation axis z (also called the rotation axis direction). In the present embodiment, as shown in FIG. 2, the three basic units 4 are labeled a U phase, a V phase and a W phase. Each of the basic units 4 includes a rotor 5 and an armature 7 corresponding to a stator. The number of basic units 4 depends upon design conditions and is an arbitrary integer of two or more. If the number of basic units 4 is varied, the output of the electrical machine 1 can easily be controlled.

The rotor unit 2 includes U-phase, V-phase and W-phase rotors 5, which are arranged along the rotation axis direction, and a shaft 20 inserted into these U-phase, V-phase and W-phase rotors 5. The rotors 5 are fixed to the shaft 20, and the shaft 20 is supported rotatably by the bearings 21a and 21b. FIG. 2 does not show a detailed structure of the rotors 5. Each of the rotors 5 includes a rotor core and a permanent magnet. A plurality of magnetic poles (e.g., forty-eight magnetic poles) are provided on the outer surfaces of the rotors 5 such that their N and S poles are alternately arranged in the rotation direction.

The stator 3 includes bearing holders 6a and 6b with the bearings 21a and 21b and U-phase, V-phase and W-phase armatures 7 provided between the bearing holders 6a and 6b along the rotation axis direction. Each of the armatures 7 is opposed to a corresponding rotor 5 with a given gap therebetween.

Figure 3A:
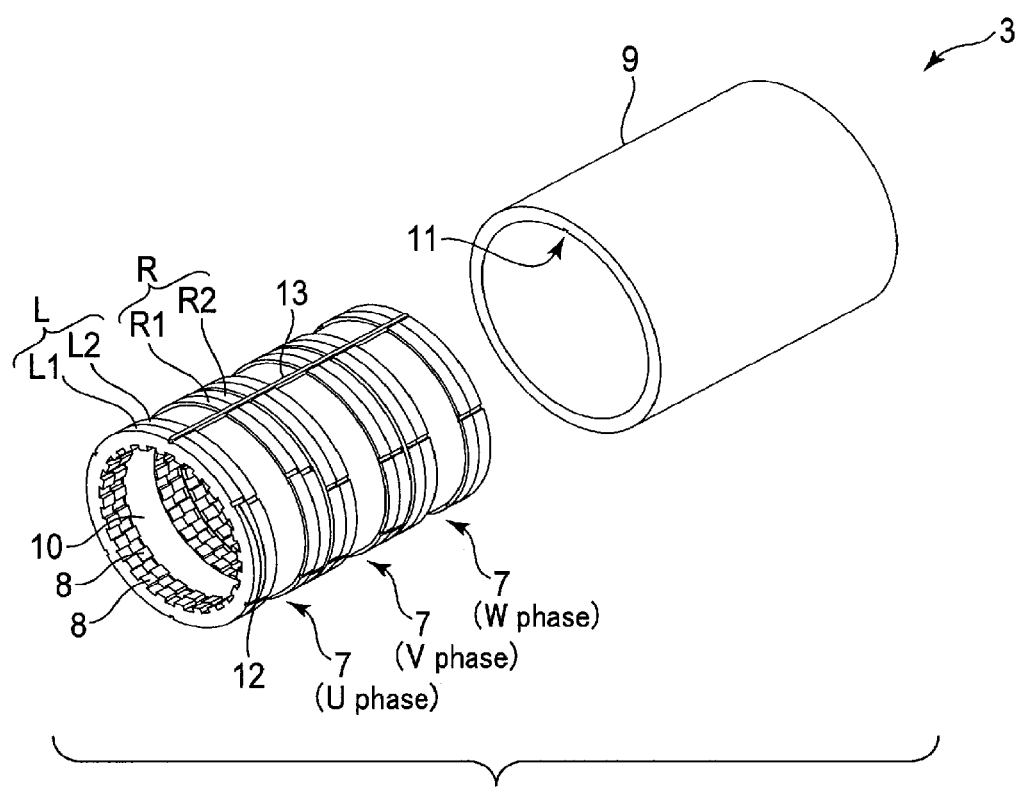
FIG. 3A is an exploded cross-sectional perspective view of a stator unit shown in FIG. 2.
Figure 3B:
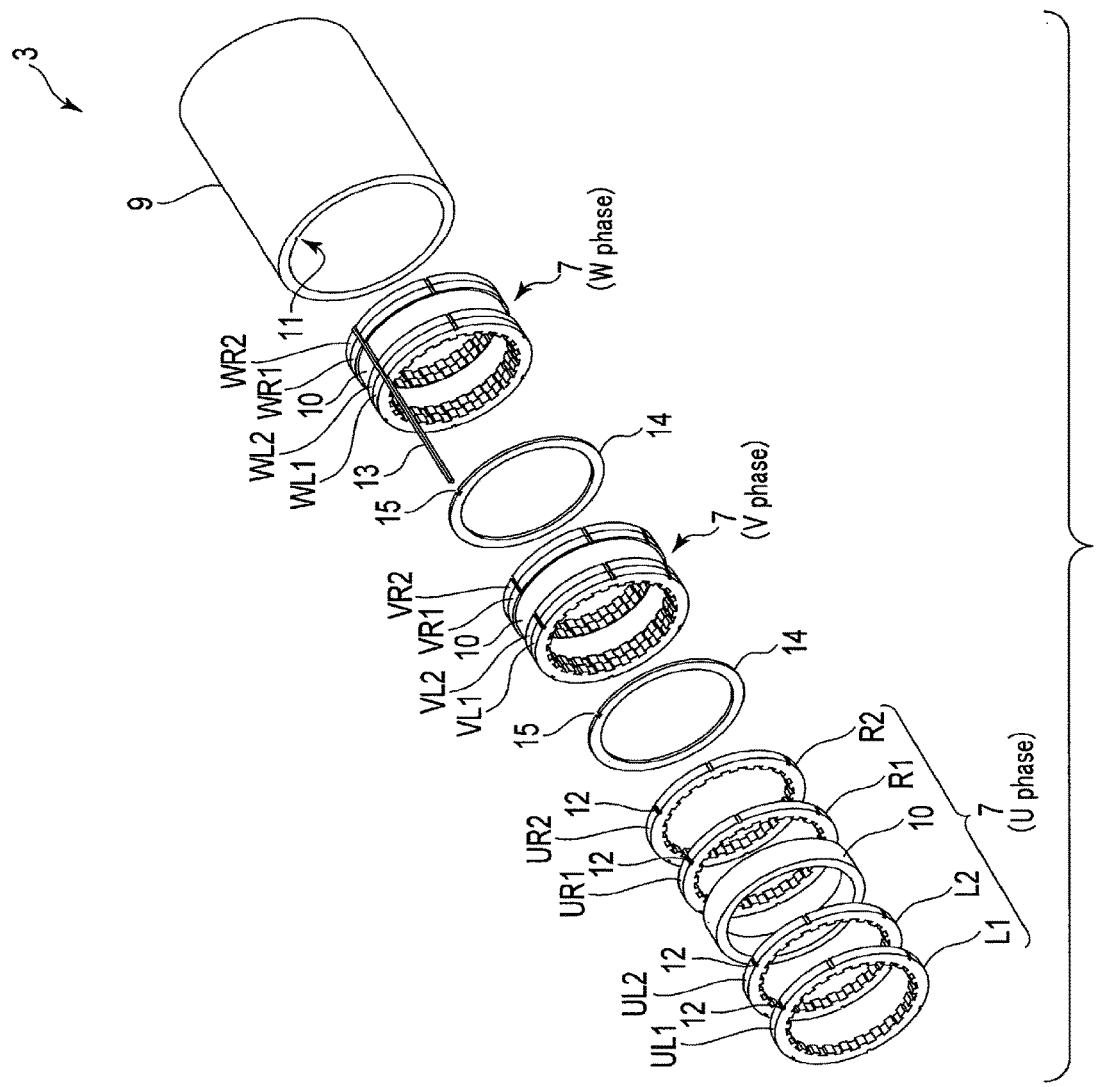
FIG. 3B is another exploded cross-sectional perspective view of the stator unit shown in FIG. 2.

FIG. 3A is an exploded perspective view showing part of the stator unit 3 and FIG. 3B is another exploded view showing the part of the stator unit 3 in more detail. The bearing holders 6a and 6b are omitted from FIGS. 3A and 3B.

As shown in FIG. 3A, the armatures 7 include a stator core L, a stator core R, a stator core 9 which is provided outside the stator cores L and R and magnetically coupled to the stator cores L and R, and an armature coil 10 provided between the stator cores L and R. The stator cores L, R and 9 and armature coil 10 have an annular shape with the rotation axis z at the center thereof. The stator cores L and R are opposed to each other in the rotation axis direction. The stator core 9 is a member common to the U-phase, V-phase and W-phase armatures 7. A key groove 11 is formed in the inner surface of the stator core 9 to extend in the rotation axis direction.

The U-phase, V-phase and W-phase armatures 7 are coupled to each other via an interphase spacer 14 as shown in FIG. 3B. More specifically, an interphase spacer 14 is arranged between the stator core R of the U-phase armature 7 and the stator core L of the V-phase armature 7, and an interphase spacer 14 is arranged between the stator core R of the V-phase armature 7 and the stator core L of the W-phase armature 7. A key groove 15 is formed in the outer surface of the interphase spacer 14 to extend in the rotation axis direction.

As shown in FIG. 3A, the stator core L is split into a plurality of members (two members in the present embodiment) to form a stage skew. Similarly, the stator core R is split into a plurality of members (two members in the present embodiment) to form a stage skew. The number of members into which the stator core L is split may be the same as or different from the number of members into which the stator core R is split. The stator core L has a stage skew structure in which a stator core L1 and a stator core L2 are coupled to each other with a relative phase angle in the rotation direction. Hereinafter, the phase angle in rotation direction is also called the rotation direction phase angle. More specifically, the stator core L1 is relatively shifted in the rotation direction by a given angle and coupled to the stator core L2. Similarly, the stator core R has a stage skew structure in which a stator core R1 and a stator core R2 are coupled to each other with a relative rotation direction phase angle. More specifically, the stator core R1 is relatively shifted in the rotation direction by a given angle and coupled to the stator core R2. To form a stage skew is effective in lowering a torque ripple.

Hereinafter, U-phase stator cores L1, L2, R1 and R2 may be referred to as stator cores UL1, UL2, UR1 and UR2, respectively, V-phase stator cores L1, L2, R1 and R2 may be referred to as stator cores VL1, VL2, VR1 and VR2, respectively, and W-phase stator cores L1, L2, R1 and R2 may be referred to as stator cores WL1, WL2, WR1 and WR2, respectively.

The stator cores L1, L2, R1 and R2 have the same shape (the same structure). The stator core L1 will be described as a typical one. As shown in FIG. 4, the stator core L1 includes an annular part and a plurality of projections which are projected in its central direction from the inner surface of the annular part and are arranged at regular intervals. The projections correspond to magnetic poles 8. In other words, the magnetic poles 8 are arranged on the inner surface of the stator core L1 at regular intervals along the rotation direction. Alternatively, the magnetic poles 8 may be disposed at irregular intervals. A plurality of key grooves 12 are formed in the outer surface of the stator core L1 to extend in the rotation axis direction. In the present embodiment, the key grooves 12 are used to set relative rotation direction phase angles of the U-phase, V-phase and W-phase stator cores L1, L2, R1 and R2. In the example shown in FIG. 4, the number of magnetic poles 8 is twenty-four and the number of key grooves 12 is six. Hereinafter, the stator core (e.g., stator core L1) including the magnetic poles 8 may be referred to as a teeth portion and the stator core 9 may be referred to as an exterior portion.

A key member 13 is fitted into a space formed by the key grooves 12 of the stator cores L1, L2, R1 and R2, the key grooves 15 of the interphase spacers 14, and the key groove 11 of the stator core 9. Accordingly, the stator cores L1, L2, R1 and R2 and the interphase spacers 14 are positioned in the stator core 9 in the rotation direction and located on the inside of the stator core 9 in a fitting state.

In the electrical machine 1, the rotor unit 2 is rotated by applying a three-phase alternating current to U-phase, V-phase and W-phase armature coils 10. More specifically, when a three-phase alternating current is applied to the U-phase, V-phase and W-phase armature coils 10, a closed-loop magnetic flux of a flux path extending from the rotor 5 to the rotor 5 via the stator cores L, 9 and R or a flux path extending from the rotor 5 to the rotor 5 via the stator cores R, 9 and L, is generated in each of the basic units 4, and the rotor unit 2 is rotated on the rotation axis z by magnetic action between a magnetic flux and a permanent magnet of the rotor 5.

The electrical machine 1 is a three-phase motor. It is thus necessary to apply electrical phase angles of 120 degrees and 240 degrees to the V phase and W phase, respectively, with reference to the U phase, and it is also necessary to apply mechanical phase angles of 5 degree and 10 degree to the V phase and W phase, respectively, with reference to the U phase. FIG. 5 shows an example of setting a rotation direction phase angle in the electrical machine 1. The rotation direction phase angles shown in FIG. 5 correspond to those relative to the U-phase stator core UL1. The reference number of each of the stator cores is used to represent its rotation direction phase angle. For example, "UL1=0" represents that the rotation direction phase angle of the stator core UL1 is 0 degrees.

As shown in FIG. 5, regarding the U phase, UL1=UR1=0 and UL2=UR2=1.25 and regarding the V phase, VL1=VR1=5 and VL2=VR2=6.25. With reference to the stator core VL1, the rotation direction phase angle of the stator core VR1 is 0 degrees, and the rotation direction phase angle of the stator cores VL2 and VR2 is 1.25 degrees. Regarding the W phase, WL1=WR1=10 and WL2=WR2=11.25. With reference to the stator core WL1, the rotation direction phase angle of the stator core WR1 is 0 degrees, and the rotation direction phase angle of the stator cores WL2 and WR2 is 1.25 degrees.

The positions of the stator cores L1, L2, R1 and R2 in which key grooves 12 are formed will be described with reference to FIG. 6. Since the stator cores L1, L2, R1 and R2 have the same shape as described above, the stator core L1 will be described as a typical one.

FIG. 6 is a front view schematically showing the stator core L1. As shown in FIG. 6, the stator core L1 includes twenty-four magnetic poles 8, and six key grooves 12 are formed in positions A to F on the outer surface of the stator core L1. The positions A to F are set as follows. The position A is set in the reference position indicated by the arrow. The position D is set in a position rotated 181.25 degrees from the reference position and, in other words, the position D is a position rotated 1.25 degrees further from the position rotated 180 degrees from the reference position. The rotation herein means a counterclockwise rotation in FIG. 6. When the twenty-four magnetic poles 8 are arranged at regular intervals, the rotation direction phase angle relative to the key groove 12 in the position D with reference to the key groove 12 in the position A is 1.25 degrees.

The position B is set in a position rotated 65 degrees from the reference position. When the twenty-four magnetic poles 8 are disposed at regular intervals, the relative rotation direction phase angle of the key groove 12 in the position B with reference to the key groove 12 in the position A is 5 degrees.

The position E is set in a position rotated 181.25 degrees from the position B and, in other words, the position E is a position rotated 1.25 degrees further from the position rotated 180 degrees from the position B. When the twenty-four magnetic poles 8 are disposed at regular intervals, the relative rotation direction phase angle of the key groove 12 in the position E with reference to the key groove 12 in the position B is 1.25 degrees. In other words, the phase rotation direction phase angle of the key groove 12 in the position E with reference to the key groove 12 in the position A is 6.25 degrees.

The position C is set in a position rotated 130 degrees from the reference position. When the twenty-four magnetic poles 8 are disposed at regular intervals, the relative rotation direction phase angle of the key groove 12 in the position C with reference to the key groove 12 in the position A is 10 degrees.

The position F is set in a position rotated 181.25 degrees from the position C and, in other words, the position F is a position rotated 1.25 degrees further from the position rotated 180 degrees from the position C. When the twenty-four magnetic poles 8 are disposed at regular intervals, the relative rotation direction phase angle of the key groove 12 in the position F with reference to the key groove 12 in the position C is 1.25 degrees. In other words, the phase rotation direction phase angle of the key groove 12 in the position F with reference to the key groove 12 in the position A is 11.25 degrees.

When the key grooves 12 in the positions B to F are combined with reference to the key groove 12 in the position A, the rotation direction phase angle can be set at 1.25 degrees, 5 degrees, 6.25 degrees, 10 degrees and 11.25 degrees. Therefore, six types of rotation direction phase angle shown in FIG. 5 are provided by using stator cores each including the key grooves 12 in the positions A to F.

FIGS. 7A, 7B, 7C and 7D show the arrangement of the U-phase stator cores L1, L2, R1 and R2 attached to the stator core 9. FIGS. 8A, 8B, 8C and 8D show the arrangement of the V-phase stator cores L1, L2, R1 and R2 attached to the stator core 9. FIGS. 9A, 9B, 9C and 9D show the arrangement of the W-phase stator cores L1, L2, R1 and R2 attached to the stator core 9. The arrows shown in FIGS. 7A to 9D represent a reference position.

Figure 7A:
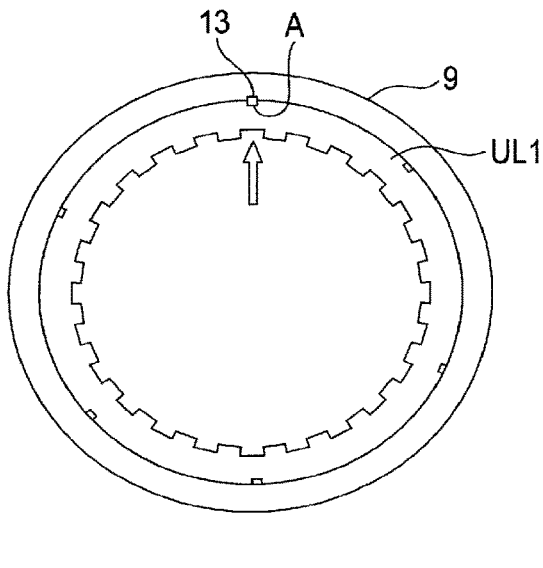
FIGS. 7A, 7B, 7C and 7D are illustrations of a method for positioning a U-phase stator core.
Figure 7B:
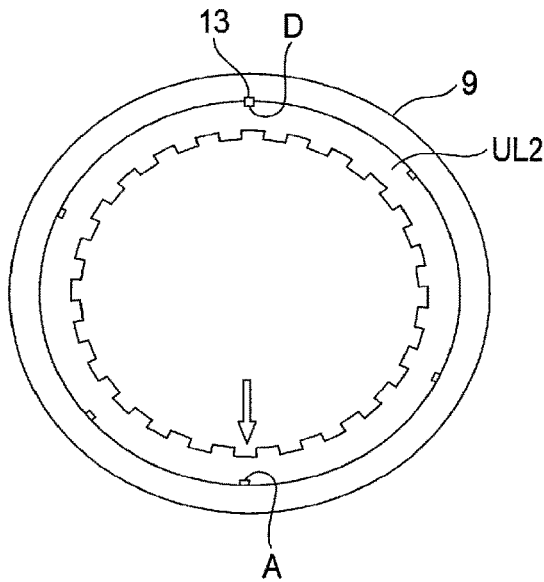
Figure 7C:
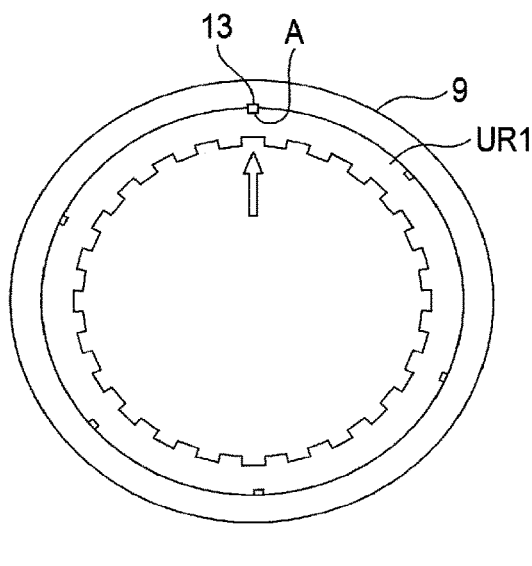
Figure 7D:
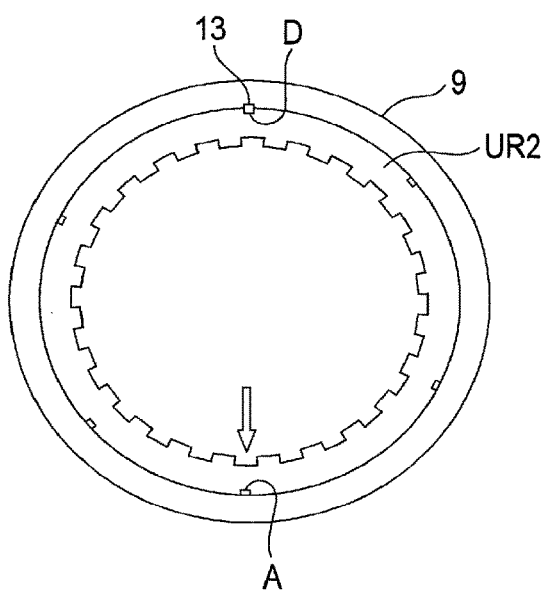
Figure 9A:
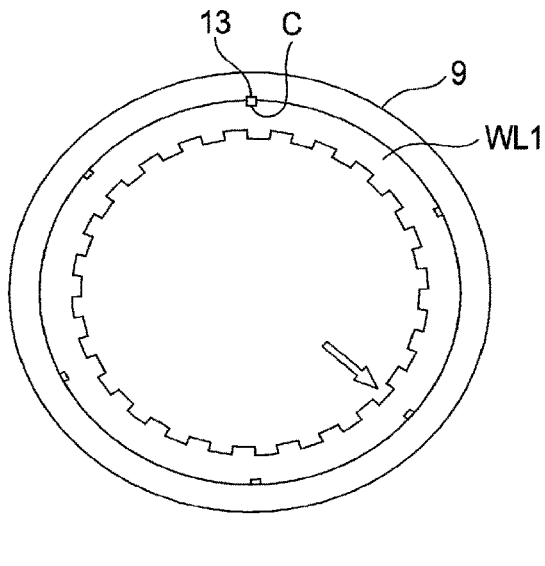
FIGS. 9A, 9B, 9C and 9D are illustrations of a method for positioning a W-phase stator core.
Figure 9B:
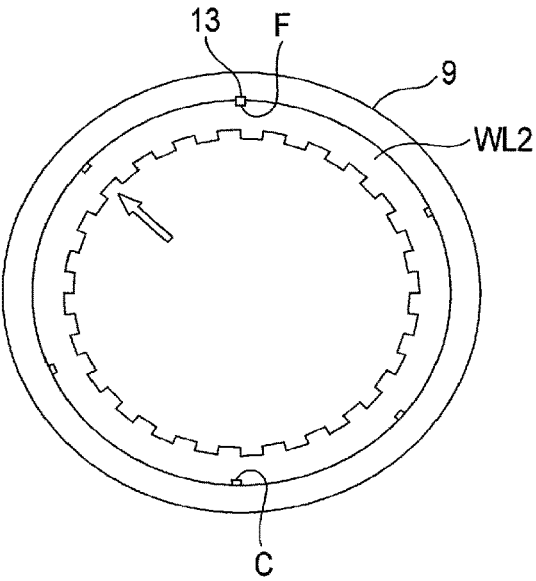
Figure 9C:
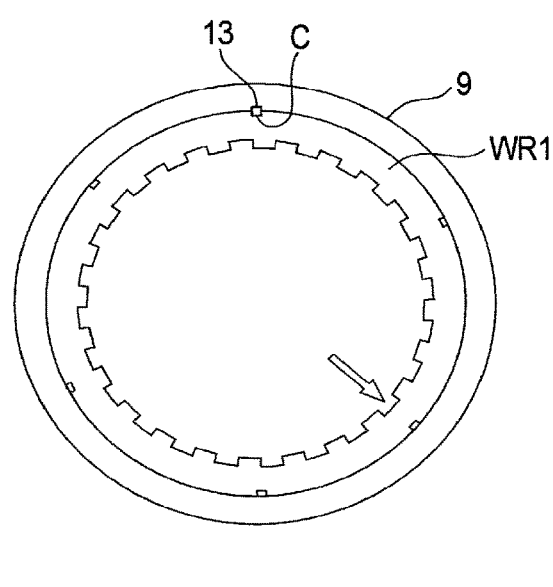
Figure 9D:
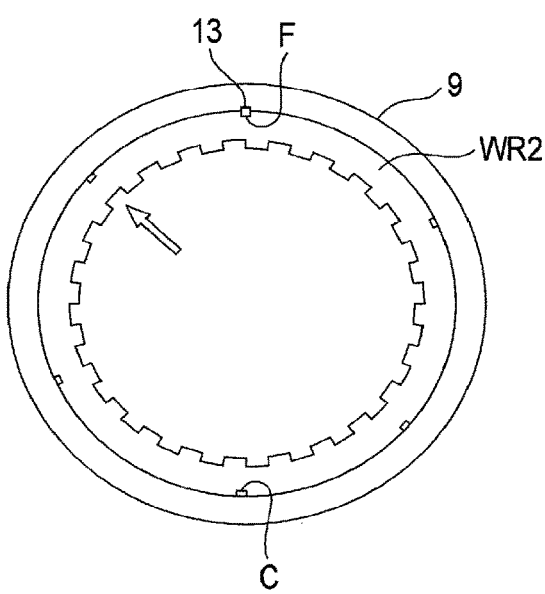

As shown in FIG. 7A, the stator core UL1 is positioned to the stator core 9 using the key groove 12 in the position A. In other words, the key member 13 is fitted into a space formed by the key groove 12 in the position A of the stator core UL1 and the key groove 11 of the stator core 9. As shown in FIG. 7B, the stator core UL2 is positioned to the stator core 9 using the key groove 12 in the position D. As shown in FIG. 7C, the stator core UR1 is positioned to the stator core 9 using the key groove 12 in the position A. As shown in FIG. 7D, the stator core UR2 is positioned to the stator core 9 using the key groove 12 in the position D. As shown in FIG. 8A, the stator core VL1 is positioned to the stator core 9 using the key groove 12 in the position B. As shown in FIG. 8B, the stator core VL2 is positioned to the stator core 9 using the key groove 12 in the position E. As shown in FIG. 8C, the stator core VR1 is positioned to the stator core 9 using the key groove 12 in the position B. As shown in FIG. 8D, the stator core VR2 is positioned to the stator core 9 using the key groove 12 in the position E. As shown in FIG. 9A, the stator core WL1 is positioned to the stator core 9 using the key groove 12 in the position C. As shown in FIG. 9B, the stator core WL2 is positioned to the stator core 9 using the key groove 12 in the position F. As shown in FIG. 9C, the stator core WR1 is positioned to the stator core 9 using the key groove 12 in the position C. As shown in FIG. 9D, the stator core WR2 is positioned to the stator core 9 using the key groove 12 in the position F.

As described above, in the electrical machine 1 according to the first embodiment, the U-phase, V-phase and W-phase stator cores L1, L2, R1 and R2 all have one type of stator core in common. These stator cores L1, L2, R1 and R2 can thus be molded by cutting using one type of pressing die, with the result that the type of pressing die required for manufacturing the stator cores can be minimized and the manufacturing costs can be lowered.

The rotation direction phase angle shown in FIG. 5 is an example of a case when the stator core (teeth portion) of the electrical machine 1 includes twenty-four magnetic poles. The rotation direction phase angle of the stator core is not limited to the example shown in FIG. 5 but is a design requirement that depends upon the number of poles. For example, when the stator core includes 20 magnetic poles, electrical phase angles of 120 degrees and 240 degrees are applied to the V phase and W phase, respectively, with reference to the U phase, and mechanical rotation direction phase angles of 6 degrees and 12 degrees are applied to the V phase and W phase, respectively, with reference to the U phase. Furthermore, the rotation direction phase angle to form a stage skew is UL2=UR2=1.5 and UR1=0 with reference to the U-phase stator core UL1. Regarding the V phase, the rotation direction phase angle is VL1=VR1=6 and VL2=LR2=7.5 with reference to the U-phase stator core UL1. When the stator core VL1 is a reference, the rotation direction phase angle of the stator cores VL2 and LR2 is 1.5 degrees. Regarding the W phase, the rotation direction phase angle is WL1=WR1=12 and WL2=WR2=13.5. When the stator core WL1 is a reference, the rotation direction phase angle of the stator cores WL2 and WR2 is 1.5 degrees. The same holds true for the following embodiments, and the rotation direction phase angle that depends upon the number of poles is changed appropriately and used in the actual equipment design. The number of poles is determined by a designer on the basis of different specification values, such as torque and the number of rotations required for equipment to be designed.

Second Embodiment

A second embodiment will be described with reference to FIGS. 10-12. In the second embodiment, descriptions of the same elements as those in the first embodiment will be omitted as appropriate.

FIG. 10 is a perspective view schematically showing an electrical machine 100 according to the second embodiment and FIG. 11 is an exploded perspective view of the electrical machine 100. As shown in FIGS. 10 and 11, the electrical machine 100 includes a rotor unit 2 which is supported by bearings 21a and 21b such that it can rotate about a rotation axis z and a stator unit 3 which is provided opposite to the outer surface of the rotor unit 2 with a given gap therebetween.

The electrical machine 100 is a three-stage (three-phase) electrical machine in which three basic units 4 are arranged along the rotation axis direction. Each of the basic units 4 includes a rotor 5 and an armature 107. The rotor unit 2 includes U-phase, V-phase and W-phase rotor 5 along the rotation axis direction and a shaft 20 inserted into these rotors 5. The stator unit 3 includes bearing holders 6a and 6b with bearings 21a and 21b and U-phase, V-phase and W-phase armatures 107 between the bearing holders 6a and 6b and along the rotation axis direction. Each of the armatures 107 is opposed to a corresponding rotor 5 with a given gap.

Figure 12:
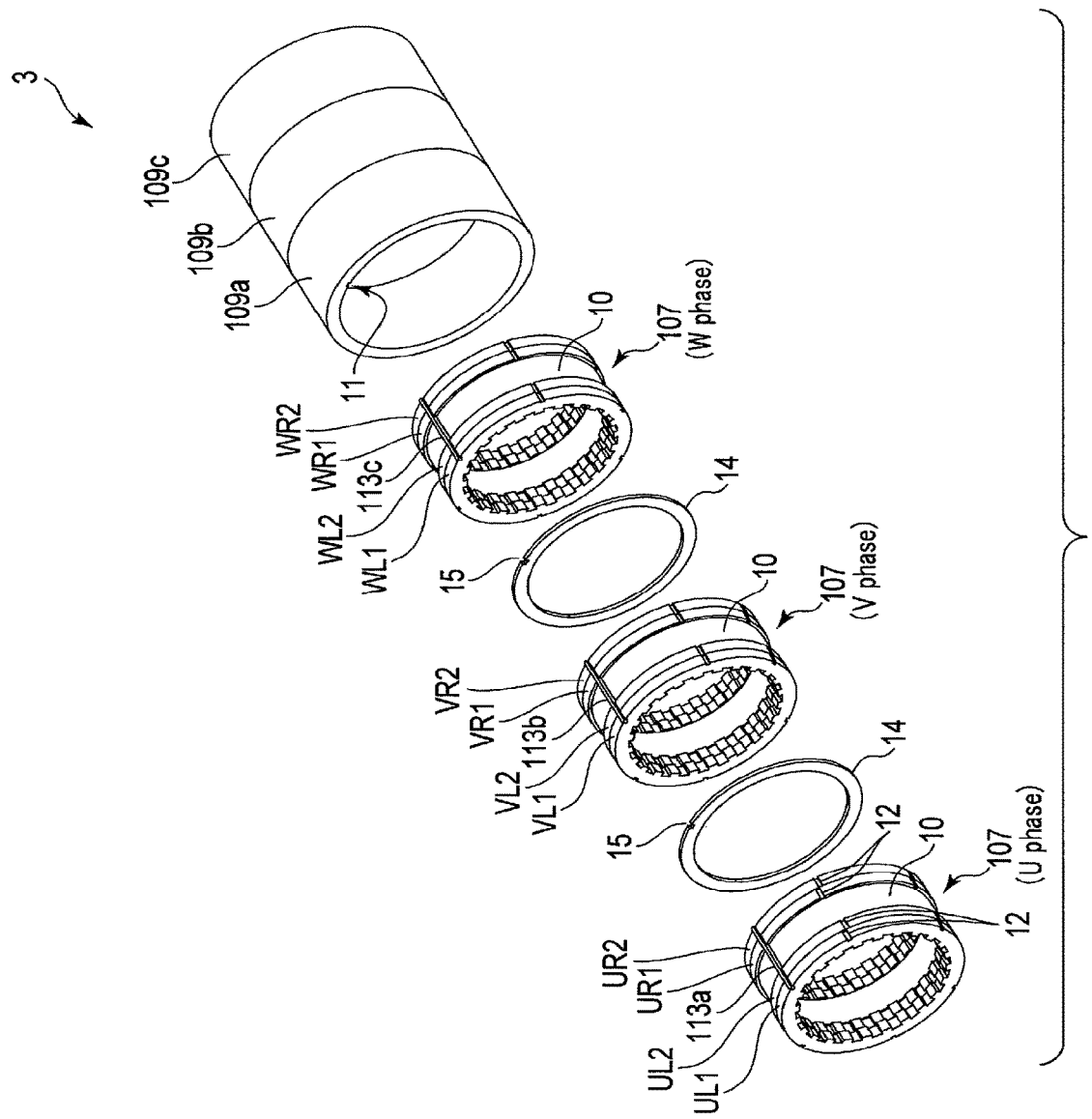
FIG. 12 is an exploded perspective view of a stator unit shown in FIG. 11.

FIG. 12 is an exploded perspective view showing part of the stator unit 3. In FIG. 12, the bearing holders 6a and 6b are omitted. As shown in FIG. 12, the U-phase, V-phase and W-phase armatures 107 are coupled to each other via an interphase spacer 14.

The U-phase armature 107 includes stator cores UL1, UL2, UR1 and UR2 with a plurality of magnetic poles 8, a stator core 109a provided outside the stator cores UL1, UL2, UR1 and UR2 and magnetically coupled to the stator cores UL1, UL2, UR1 and UR2, and an armature coil 10 provided between the stator cores UL2 and UR1. The stator core 109a has an annular shape with the rotation axis z at the center thereof. A key groove 11 is formed in the inner surface of the stator core 109a to extend in the rotation axis direction. A key member 113a is fitted into a space formed by the key grooves 12 of the stator cores UL1, UL2, UR1 and UR2 and the key groove 11 of the stator core 109a. Accordingly, the stator cores UL1, UL2, UR1 and UR2 are positioned in the stator core 109a in the rotation direction and located on the inside of the stator core 109a in a fitting state.

The V-phase armature 107 includes stator cores VL1, VL2, VR1 and VR2 with a plurality of magnetic poles 8, a stator core 109b provided outside the stator cores VL1, VL2, VR1 and VR2 and magnetically coupled to the stator cores VL1, VL2, VR1 and VR2, and an armature coil 10 provided between the stator cores VL2 and VR1. The stator core 109b has an annular shape with the rotation axis z at the center thereof. A key groove 11 is formed in the inner surface of the stator core 109b to extend in the rotation axis direction. A key member 113b is fitted into a space formed by the key grooves 12 of the stator cores VL1, VL2, VR1 and VR2 and the key groove 11 of the stator core 109b. Accordingly, the stator cores VL1, VL2, VR1 and VR2 are positioned to the stator core 109b in the rotation direction and located on the inside of the stator core 109b in a fitting state.

The W-phase armature 107 includes stator cores WL1, WL2, WR1 and WR2 with a plurality of magnetic poles 8, a stator core 109c provided outside the stator cores WL1, WL2, WR1 and WR2 and magnetically coupled to the stator cores WL1, WL2, WR1 and WR2, and an armature coil 10 provided between the stator cores WL2 and WR1. The stator core 109c has an annular shape with the rotation axis z at the center thereof. A key groove 11 is formed in the inner surface of the stator core 109c to extend in the rotation axis direction. A key member 113c is fitted into a space formed by the key grooves 12 of the stator cores WL1, WL2, WR1 and WR2 and the key groove 11 of the stator core 109c. Accordingly, the stator cores WL1, WL2, WR1 and WR2 are positioned to the stator core 109c in the rotation direction and located on the inside of the stator core 109c in a fitting state.

As described above, in the second embodiment, the stator cores 109a, 109b and 109c and key members 113a, 113b and 113c are provided for the U phase, V phase and W phase, respectively. The stator cores 109a, 109b and 109c and key members 113a, 113b and 113c according to the second embodiment correspond to three stator cores and three key members into which the stator core 9 and key member 13 (FIG. 3A) according to the first embodiment are each divided for the U phase, V phase and W phase. Accordingly, an armature 107 can be assembled for each of the phases.

Though the number of parts in the second embodiment becomes larger than that in the first embodiment, it is possible to improve manufacturability and assemblability in a large-sized electrical machine, with the result that manufacturing costs can be lowered.

Third Embodiment

An electrical machine according to a third embodiment will be described with reference to FIGS. 13-15B. In the third embodiment, descriptions of the same elements as those in the first embodiment will be omitted as appropriate.

Figures 13, 14:
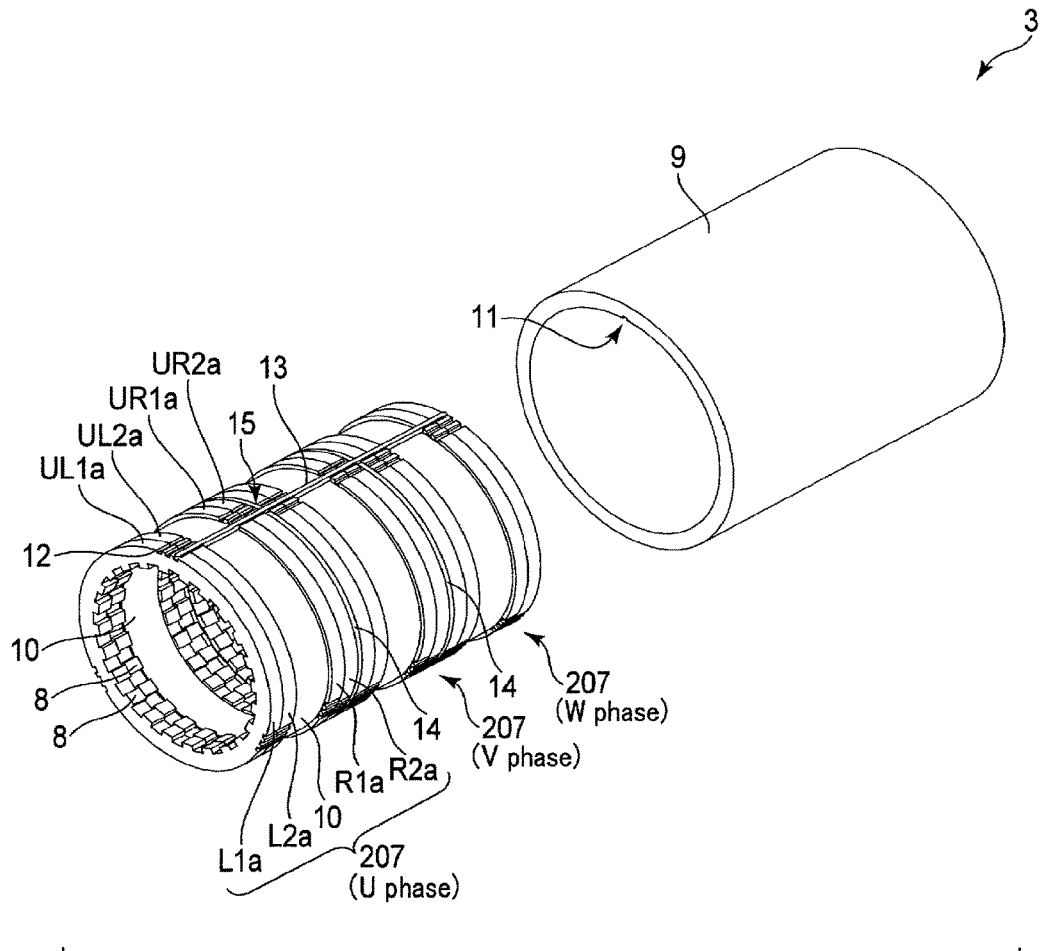
FIG. 13 is an exploded perspective view of a stator unit according to a third embodiment.
FIG. 14 is a table showing an example of setting a rotation direction phase angle in an electrical machine according to the third embodiment.

FIG. 13 is an exploded perspective view schematically showing part of a stator unit 3 included in the electrical machine according to the third embodiment. The electrical machine according to the third embodiment is a three-stage (three-phase) electrical machine in which three basic units are arranged along the rotation axis direction. As shown in FIG. 13, each of the basic units includes a rotor (not shown) and an armature 207. The stator unit 3 includes bearing holders (not shown) with bearings for rotatably supporting a rotor unit (not shown) including the rotor, and U-phase, V-phase and W-phase armatures 207 provided between the bearing holders and along the rotation axis direction. Each of the armatures 207 is opposed to a corresponding rotor with a given gap therebetween.

Each of the armatures 207 includes stator cores L1a, L2a, R1a and R2a each having a plurality of magnetic poles 8, a stator core 9 provided outside the stator cores L1a, L2a, R1a and R2a and magnetically coupled to the stator cores L1a, L2a, R1a and R2a, and an armature coil 10 provided between the stator cores L2a and R1a. The stator cores L1a, L2a, R1a and R2a each have an annular shape with the rotation axis z at the center thereof. The stator cores L1a, L2a, R1a and R2a are arranged in this order in the rotation axis direction. The stator core L1a is relatively shifted in its rotation direction by a given angle and coupled to the stator core L2a. The stator core R1a is relatively shifted in its rotation direction by a given angle and coupled to the stator core R2a. In the third embodiment, the stator core 9 is a member common to the U-phase, V-phase and W-phase. A key groove 11 is formed in the inner surface of the stator core 9 to extend in the rotation axis direction.

The U-phase, V-phase and W-phase armatures 207 are coupled to each other via an interphase spacer 14. More specifically, an interphase spacer 14 is arranged between the U-phase stator core R2a and the V-phase stator core L1a, and an interphase spacer 14 is arranged between the V-phase stator core R2a and the W-phase stator core L1a. A key groove 15 is formed in the outer surface of each of the interphase spacers 14 to extend in the rotation axis direction.

A key member 13 is fitted into a space by the key grooves 12 of the stator cores L1a, L2a, R1a and R2a, the key grooves 15 the interphase spacers 14, and the key groove 11 of the stator core 9. Accordingly, the stator cores L1a, L2a, R1a and R2a and the interphase spacers 14 are positioned in the stator core 9 in the rotation direction and located on the inside of the stator core 9 in a fitting state.

Hereinafter, U-phase stator cores L1a, L2a, R1a and R2a may be referred to as stator cores UL1a, UL2a, UR1a and UR2a, respectively, V-phase stator cores L1a, L2a, R1a and R2a may be referred to as stator cores VL1a, VL2a, VR1a and VR2a, respectively, and W-phase stator cores L1a, L2a, R1a and R2a may be referred to as stator cores WL1a, WL2a, WR1a and WR2a, respectively.

FIG. 14 shows an example of setting a rotation direction phase angle in the electrical machine according to the third embodiment. The rotation direction phase angle shown in FIG. 14 corresponds to a relative rotation direction phase angle with reference to the stator core UL1a. The rotation direction phase angle of a stator core is represented using a reference symbol added to the stator core. For example, "UL1a=0" represents that the rotation direction phase angle of the U-phase stator core UL1a is 0 degrees.

As shown in FIG. 14, regarding the U phase, UL1a=0, UR1a=UL2a=1.25 and UR2a=2.5 and regarding the V phase, VL1a=5, VR1a=VL2a=6.25 and VR2a=7.5. With reference to the stator core VL1a, the rotation direction phase angle of the stator cores VL2a and VR1a is 1.25 degrees and the rotation direction phase angle of the stator core VR2a is 2.5 degrees. Regarding the W phase, WL1a=10, WR1a=WL2a=11.25 and WR2a=12.5. With reference to the stator core WL1a, the rotation direction phase angle of the stator cores WL2a and WR1a is 1.25 degrees and the rotation direction phase angle of the stator cores WR2a is 2.5 degrees. Thus, the electrical machine according to the third embodiment has nine different rotation direction phase angles.

A position in which the key groove 12 is formed in the outer surface of a stator core will be described with reference to FIGS. 15A and 15B. Since the stator cores L1a, L2a, R1a and R2a have the same shape, the stator core L1a will be described here as a typical one.

Figure 15A:
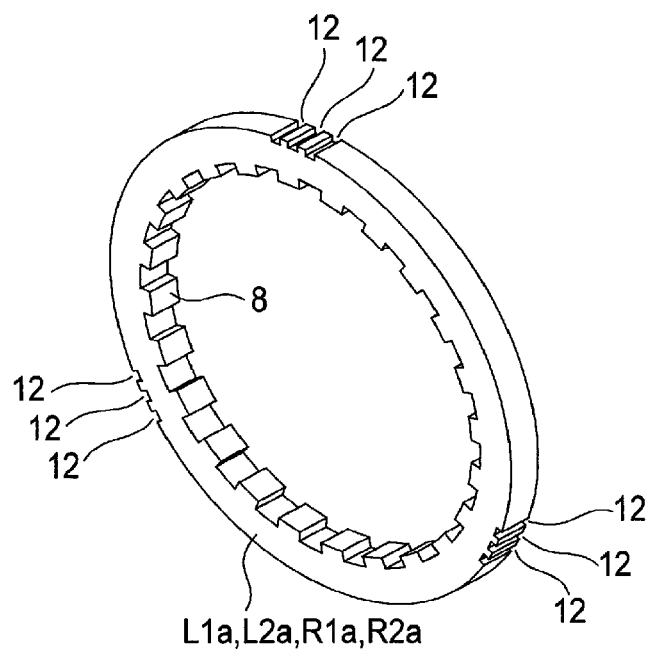
FIG. 15A is a perspective view showing a stator core (teeth portion) according to the third embodiment.
Figure 15B:
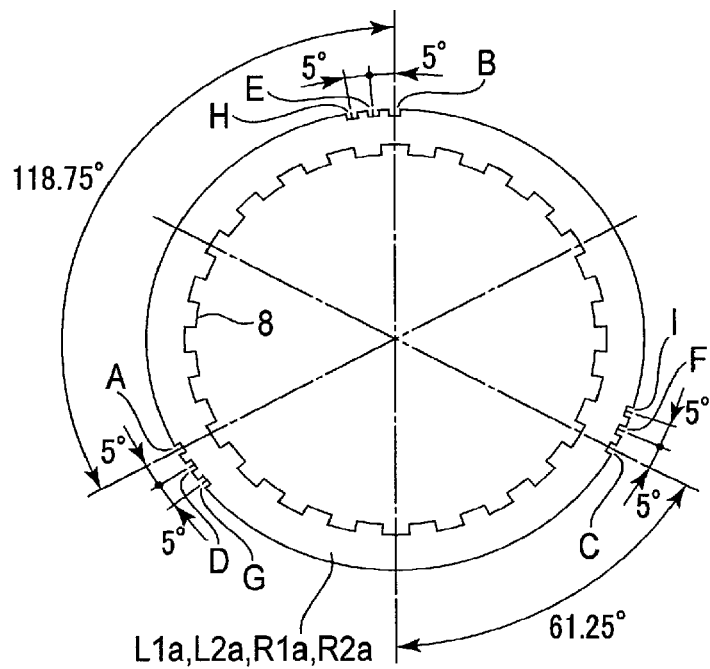
FIG. 15B is a front view of the stator core shown in FIG. 15A.

FIGS. 15A and 15B are respectively a perspective view and a front view schematically showing the stator core L1a. As shown in FIGS. 15A and 15B, twenty-four magnetic poles 8 are disposed on the inner surface of the stator core L1a, and nine key grooves 12 are formed in their respective positions A-I on the outer surface of the stator core L1a. The positions A-I are set as follows. The position B is set in a reference position. The position A is set in a position that is rotated 118.75 degrees from the reference position. In other words, the position A is a position that is rotated 1.25 degrees in the reverse direction from a position that is rotated 180 degrees from the position B. When the twenty-four magnetic poles 8 are arranged at regular intervals, the relative rotation direction phase angle of the key groove 12 in the position B based upon the key groove 12 in the position A is 1.25 degrees.

The position C is set in a position that is rotated 241.25 degrees from the position B. In other words, the position C is a position that is rotated 61.25 (=60+1.25) degrees from a position that is rotated 180 degrees from the position B. When the twenty-four magnetic poles 8 are arranged at regular intervals, the relative rotation direction phase angle of the key groove 12 in the position C with reference to the key groove 12 in the position A is 2.5 degrees.

The position D is set in a position that is rotated 5 degrees from the position A and the position G is set in a position that is rotated 10 degrees from the position A. The position E is set in a position that is rotated 5 degrees from the position B and the position H is set in a position that is rotated 10 degrees from the position B. The position F is set in a position that is rotated 5 degrees from the position C and the position I is set in a position that is rotated 10 degrees from the position C.

When the key grooves 12 in the positions B-I are combined with reference to the key groove 12 in the position A, the rotation direction phase angles of 1.25 degrees, 2.5 degrees, 5 degrees, 6.25 degrees, 7.5 degrees, 10 degrees, 11.25 degrees and 12.5 degrees can be set. Using stator cores including the key grooves 12 in the positions A-I, the nine different rotation direction phase angles shown in FIG. 14 can be provided.

In the electrical machine according to the third embodiment as described above, the U-phase, V-phase and W-phase stator cores L1a, L2a, R1a and R2a have one type of stator core in common. The one type of stator core makes it possible to form stage skews corresponding to the nine different rotation direction phase angles and thus a torque ripple can be lowered more than in the first and second embodiments. Moreover, the stator cores L1a, L2a, R1a and R2a can be molded by cutting using one type of pressing die, with the result that the manufacturing costs can be lowered.

Fourth Embodiment

An electrical machine according to a fourth embodiment will be described with reference to FIGS. 16-18C. In the fourth embodiment, descriptions of the same elements as those in the first and second embodiments will be omitted as appropriate.

FIG. 16 is an exploded perspective view schematically showing part of a stator unit 3 included in the electrical machine according to the fourth embodiment. The electrical machine according to the fourth embodiment is a three-stage (three-phase) electrical machine in which three basic units are arranged along the rotation axis direction. As shown in FIG. 16, each of the basic units includes a rotor (not shown) and an armature 307. The stator 3 includes bearing holders (not shown) with bearings for rotatably supporting a rotor unit (not shown) including the rotor, and U-phase, V-phase and W-phase armatures 307 provided between the bearing holders and along the rotation axis direction. Each of the armatures 307 is opposed to a corresponding rotor 5 with a given gap therebetween. The U-phase, V-phase and W-phase armatures 307 are coupled to each other via an interphase spacer 14.

The U-phase armature 307 includes stator cores UL1b, UL2b, UR1b and UR2b having a plurality of magnetic poles 8, a stator core 309a provided outside the stator cores UL1b, UL2b, UR1b and UR2b and magnetically coupled to the stator cores UL1b, UL2b, UR1b and UR2b, and an armature coil 10 provided between the stator cores UL2b and UR1b. The stator cores UL1b, UL2b, UR1b and UR2b and the stator core 309a each have an annular shape with the rotation axis z at the center thereof. The stator cores UL1b, UL2b, UR1b and UR2b are arranged in this order in the rotation axis direction. A key groove 12 is formed in the outer surface of each of the stator cores UL1b, UL2b, UR1b and UR2b to extend in the rotation axis direction. A key groove 11 is formed in the inner surface of the stator core 309a to extend in the rotation axis direction. A key member 313a is fitted into a space formed by the key grooves 12 of the stator cores UL1b, UL2b, UR1b and UR2b and the key groove 11 of the stator core 309a. Accordingly, the stator cores UL1b, UL2b, UR1b and UR2b are positioned in the stator core 309a in the rotation direction and located on the inside of the stator core 309a in a fitting state.

The V-phase armature 307 includes stator cores VL1b, VL2b, VR1b and VR2b having a plurality of magnetic poles 8, a stator core 309b provided outside the stator cores VL1b, VL2b, VR1b and VR2b and magnetically coupled to the stator cores VL1b, VL2b, VR1b and VR2b, and an armature coil 10 provided between the stator cores VL2b and VR1b. The stator cores VL1b, VL2b, VR1b and VR2b and the stator core 309b each have an annular shape with the rotation axis z at the center thereof. The stator cores VL1b, VL2b, VR1b and VR2b are arranged in that order in the rotation axis direction. A key groove 12 is formed in the outer surface of each of the stator cores VL1b, VL2b, VR1b and VR2b to extend in the rotation axis direction. A key groove 11 is formed in the inner surface of the stator core 309b to extend in the rotation axis direction. A key member 313b is fitted into a space formed by the key grooves 12 of the stator cores VL1b, VL2b, VR1b and VR2b and the key groove 11 of the stator core 309b. Accordingly, the stator cores VL1b, VL2b, VR1b and VR2b are positioned in the stator core 309b in the rotation direction and located on the inside of the stator core 309b in a fitting state.

The W-phase armature 307 includes stator cores WL1b, WL2b, WR1b and WR2b having a plurality of magnetic poles 8, a stator core 309c provided outside the stator cores WL1b, WL2b, WR1b and WR2b and magnetically coupled to the stator cores WL1b, WL2b, WR1b and WR2b, and an armature coil 10 provided between the stator cores WL2b and WR1b. The stator cores WL1b, WL2b, WR1b and WR2b and the stator core 309c each have an annular shape with the rotation axis z at the center thereof. The stator cores WL1b, WL2b, WR1b and WR2b are arranged in that order in the rotation axis direction. A key groove 12 is formed in the outer surface of each of the stator cores WL1b, WL2b, WR1b and WR2b to extend in the rotation axis direction. A key groove 11 is formed in the inner surface of the stator core 309c to extend in the rotation axis direction. A key member 313c is fitted into a space formed by the key grooves 12 of the stator cores WL1b, WL2b, WR1b and WR2b and the key groove 11 of the stator core 309c. Accordingly, the stator cores WL1b, WL2b, WR1b and WR2b are positioned in the stator core 309c in the rotation direction and located on the inside of the stator core 309c in a fitting state.

As described above, in the fourth embodiment, the stator cores 309a, 309b and 309c are provided for the U phase, V phase and W phase, respectively, as are the key members 313a, 313b and 313c. Accordingly, an armature 307 can be assembled for each of the phases.

In the fourth embodiment, a rotation direction phase angle of each of the U-phase, V-phase and W-phase armatures 307 (a difference in rotation direction phase angle between the U phase, V phase and W phase) is set according to the arrangement of these armatures 307. In the fourth embodiment, the key grooves 12 are used to set a relative rotation direction phase angle of the stator cores L1, L2, R1 and R2 for each of the phases. The stator core 309b is coupled to the stator core 309a by a fixing method (not shown) such that the key groove 11 of the stator core 309b has a relative rotation direction phase angle of 5 degrees with reference to the key groove 11 of the stator core 309a. Furthermore, the stator core 309c is coupled to the stator core 309b by a fixing method (not shown) such that the key groove 11 of the stator core 309c has a relative rotation direction phase angle of 5 degrees with reference to the key groove 11 of the stator core 309b. In other words, the key groove 11 of the stator core 309c has a relative rotation direction phase angle of 10 degrees with reference to the key groove 11 of the stator core 309a.

FIG. 17 is a front view showing an arrangement of U-phase, V-phase and W-phase armatures 307. The stator cores 309a, 309b and 309c are omitted from FIG. 17. As shown in FIG. 17, the key members 313a, 313b and 313c are so arranged that the key members 313b and 313c have relative rotation direction phase angles of 5 degrees and 10 degrees in the rotation direction with reference to the key member 313a.

A position in which a key groove 12 is formed in the outer surface of each of the stator cores L1b, L2b, R1b and R2b will be described with reference to FIGS. 18A, 18B and 15C. Since the stator cores L1b, L2b, R1b and R2b have the same shape, the stator core L1b will be described here as a typical one.

Figure 18A:
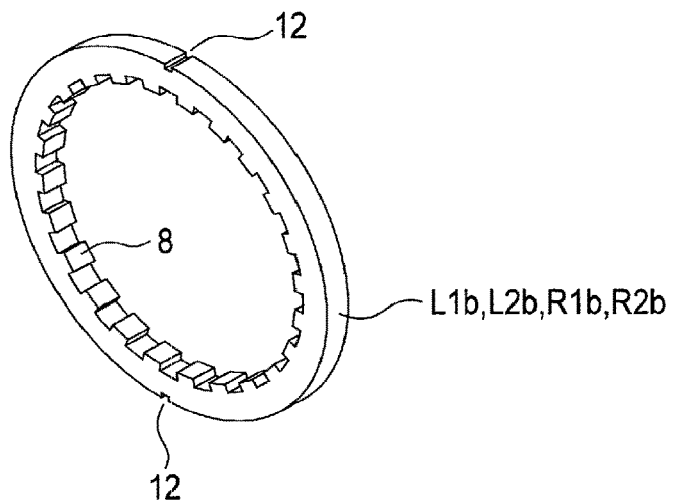
FIG. 18A is a perspective view showing a stator core (teeth portion) according to the fourth embodiment.
Figure 18B:
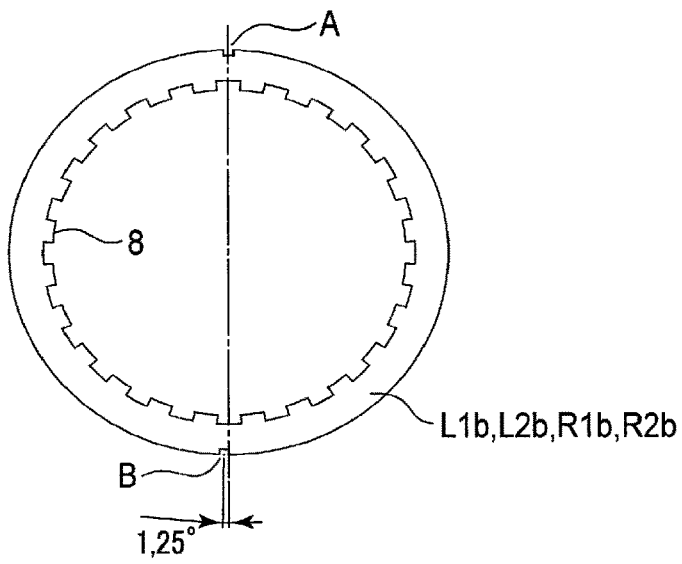
FIG. 18B is a front view of the stator core shown in FIG. 18A.
Figure 18C:
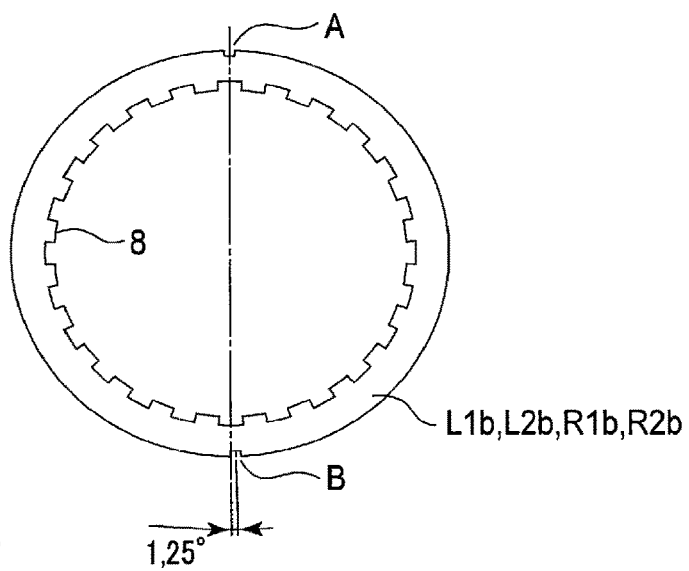
FIG. 18C is a rear view of the stator core shown in FIG. 18A.

FIGS. 18A, 18B and 18C are respectively a perspective view, a front view and a rear view showing the stator core L1b. The stator core L1b shown in FIG. 18A includes twenty-four magnetic poles 8, and two key grooves 12 are formed in their respective positions A and B on the outer surface of the stator core L1b, as shown in FIGS. 18B and 18C. The positions A and B are set as follows. The position A is set in a reference position. The position B is set in a position that is rotated 178.75 degrees counterclockwise from the position A in FIG. 18B.

In the front view of FIG. 18B, the position B is a position that is rotated 1.25 degrees in the reverse direction from a position that is rotated 180 degrees from the position A. The relative rotation direction phase angle of the key groove 12 in the position B with reference to the key groove 12 in the position A is −1.25 degrees. In the rear view of FIG. 18C, the position B is a position that is rotated 1.25 degrees further from a position that is rotated 180 degrees from the position A. The relative rotation direction phase angle of the key groove 12 in the position B with reference to the key groove 12 in the position A is +1.25 degrees. If the arrangement shown in the front view and that shown in the rear view are used in combination, three different rotation direction phase angles of 0 degrees, 1.25 degrees and 2.5 degrees can be set.

As described above, in the electrical machine according to the fourth embodiment, the rotation direction phase angles shown in FIG. 14 can be attained by combining the rotation direction phase angles of the stator cores 309a, 309b and 309c and those of the stator cores L1b, L2b, R1b and R2b. Accordingly, a torque ripple in the fourth embodiment can be lowered more than in the first and second embodiments. Moreover, the number of key grooves 12 becomes smaller than that in the first to third embodiments. Since, therefore, the influence of the key grooves 12 on magnetic properties can be lessened, the fourth embodiment is effective in applying to a high-performance electrical machine that requires a low torque ripple.

Fifth Embodiment

The fifth embodiment is a modification of the fourth embodiment. In the fifth embodiment, descriptions of the same elements as those in the fourth embodiment will be omitted as appropriate.

Figures 19, 20:
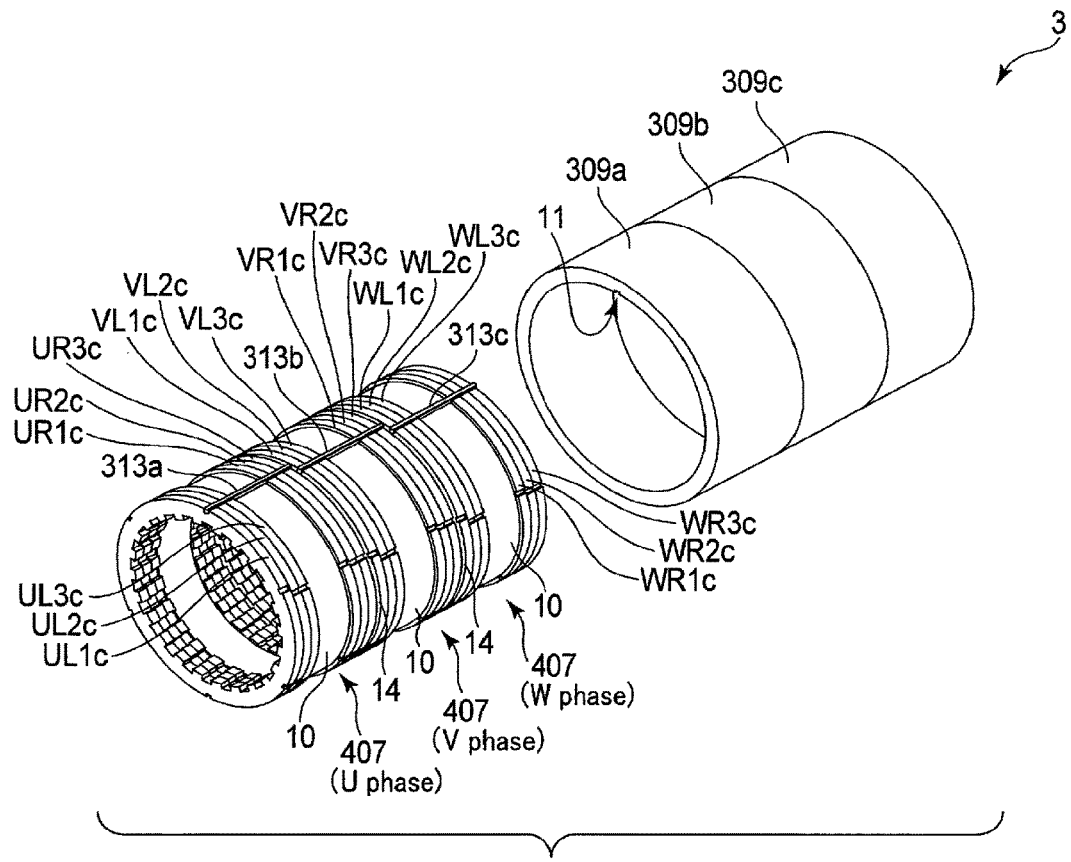
FIG. 19 is an exploded perspective view of a stator unit according to a fifth embodiment.
FIG. 20 is a table showing an example of setting a rotation direction phase angle in an electrical machine according to the fifth embodiment.

FIG. 19 is an exploded perspective view schematically showing part of a stator unit 3 included in the electrical machine according to the fifth embodiment. The electrical machine according to the fifth embodiment is a three-stage (three-phase) electrical machine in which three basic units are arranged along the rotation axis direction. As shown in FIG. 19, each of the basic units includes a rotor (not shown) and an armature 407. The stator 3 includes bearing holders (not shown) with bearings for rotatably supporting a rotor unit (not shown) including the rotor, and U-phase, V-phase and W-phase armatures 407 provided between the bearing holders and along the rotation axis direction. Each of the armatures 407 is opposed to a corresponding rotor 5 with a given gap therebetween. The U-phase, V-phase and W-phase armatures 407 are coupled to each other via an interphase spacer 14.

The stator core L includes stator cores L1c, L2c and L3c disposed to form a stage skew, and the stator core R includes stator cores R1c, R2c and R3c disposed to form a stage skew. The stator cores L1c, L2c, L3c, R1c, R2c and R3c have the same shape.

Here, U-phase stator cores L1c, L2c, L3c, R1c, R2c and R3c may be referred to as stator cores UL1c, UL2c, UL3c, UR1c, UR2c and UR3c, respectively, V-phase stator cores L1c, L2c, L3c, R1c, R2c and R3c may be referred to as stator cores VL1c, VL2c, VL3c, VR1c, VR2c and VR3c, respectively, and W-phase stator cores L1c, L2c, L3c, R1c, R2c and R3c may be referred to as stator cores WL1c, WL2c, WL3c, WR1c, WR2c and WR3c, respectively.

FIG. 20 shows an example of setting a rotation direction phase angle in the electrical machine according to the fifth embodiment. The rotation direction phase angle shown in FIG. 20 corresponds to a relative rotation direction phase angle with reference to the stator core UL1c. As shown in FIG. 20, regarding the U phase, UL1c=0, UL2c=0.83, UL3c=1.67, UR1c=1.25, UR2c=2.08 and UR3c=2.92 and regarding the V phase, VL1c=5, VL2c=5.83, VL3c=6.67, VR1c=6.25, VR2c=7.08 and VR3c=7.92. With reference to the stator core VL1c, the rotation direction phase angles of the stator cores VL2c, VL3c, VR1c, VR2c and VR3c are 0.83 degrees, 1.67 degrees, 1.25 degrees, 2.08 degrees and 2.92 degrees. Regarding the W phase, WL1c=10, WL2c=10.83, WL3c=11.67, WR1c=11.25, WR2c=12.08 and WR3c=12.92. With reference to the stator core WL1c, the rotation direction phase angles of the stator cores WL2c, WL3c, WR1c, WR2c and WR3c are 0.83 degrees, 1.67 degrees, 1.25 degrees, 2.08 degrees and 2.92 degrees. Thus, the electrical machine according to the fifth embodiment has eighteen different rotation direction phase angles.

Like in the fourth embodiment, in the fifth embodiment, the stator cores 309a, 309b and 309c are coupled and fixed in the rotation axis direction. Specifically, the stator core 309b is coupled to the stator core 309a by a fixing method (not shown) such that the key groove 11 of the stator core 309b has a relative rotation direction phase angle of 5 degrees with reference to the key groove 11 of the stator core 309a. Furthermore, the stator core 309c is coupled to the stator core 309b by a fixing method (not shown) such that the key groove 11 of the stator core 309c has a relative rotation direction phase angle of 5 degrees with reference to the key groove 11 of the stator core 309b. In other words, the key groove 11 of the stator core 309c has a relative rotation direction phase angle of 10 degrees with reference to the key groove 11 of the stator core 309a.

A position in which the key groove 12 is formed in the outer surface of each of the stator cores L1c, L2c, L3c, R1c, R2c and R3c will be described with reference to FIGS. 21A and 21B. Since the stator cores L2c, L3c, R1c, R2c and R3c have the same shape as that of the stator core L1c, the stator core L1c will be described here as a typical one.

FIGS. 21A and 21B are respectively a perspective view and a front view showing the stator core L1c. As shown in FIGS. 21A and 21B, twenty-four magnetic poles 8 are disposed on the outer surface of the stator core L1c, and six key grooves 12 are formed in their respective positions A-F on the outer surface of the stator core L1c. The positions A-F are set as follows. The position A is set in a reference position. The position B is set in a position that is rotated 60.83 (=60+0.83) degrees from the position A. The relative rotation direction phase angle of the key groove 12 in the position B with reference to the key groove 12 in the position A is 0.83 degrees. The position C is set in a position that is rotated 121.67 (=120+1.67) degrees from the position A. The relative rotation direction phase angle of the key groove 12 in the position C with reference to the key groove 12 in the position A is 1.67 degrees. The position D is set in a position that is rotated 181.25 (=180+1.25) degrees from the position A. The relative rotation direction phase angle of the key groove 12 in the position D with reference to the key groove 12 in the position A is 1.25 degrees. The position E is set in a position that is rotated 242.08 (=180+60+2.08) degrees from the position A. The relative rotation direction phase angle of the key groove 12 in the position E with reference to the key groove 12 in the position A is 2.08 degrees. The position F is set in a position that is rotated 302.92 (=180+120+2.92) degrees from the position A. The relative rotation direction phase angle of the key groove 12 in the position F with reference to the key groove 12 in the position A is 2.92 degrees.

As described above, in the electrical machine according to the fifth embodiment, the eighteen different rotation direction phase angles shown in FIG. 20 can be attained by combining the three different rotation direction phase angles of the stator cores 309a, 309b and 309c and the six different rotation direction phase angles of the stator cores L1c, L2c, L3c, R1c, R2c and R1c. Accordingly, a torque ripple in the fifth embodiment can be lowered more than in the first to fourth embodiments. The fifth embodiment is effective in applying to a high-performance electrical machine that requires a low torque ripple.

Sixth Embodiment

The sixth embodiment is a modification of the fourth embodiment. In the sixth embodiment, descriptions of the same elements as those in the fourth embodiment will be omitted as appropriate.

FIG. 22 is an exploded perspective view schematically showing part of a stator unit 3 included in the electrical machine according to the sixth embodiment. The electrical machine according to the sixth embodiment is a three-stage (three-phase) electrical machine in which three basic units are arranged along the rotation axis direction. As shown in FIG. 22, each of the basic units includes a rotor (not shown) and an armature 507. The stator 3 includes bearing holders (not shown) with bearings for rotatably supporting a rotor unit (not shown) including the rotor, and U-phase, V-phase and W-phase armatures 507 provided between the bearing holders and along the rotation axis direction. Each of the armatures 507 is opposed to a corresponding rotor with a given gap therebetween.

Each of the armatures 507 includes a stator core L, a stator core R, a stator core 309 (a stator core 309a, 309b or 309c) which is provided outside the stator cores L and R and magnetically coupled to the stator cores L and R, and an armature coil 10 provided between the stator cores L and R. The sixth embodiment differs from the foregoing first to fifth embodiments in that the stator cores L and R are not split, i.e., no stage skews are provided.

Since the stator cores L and R have the same shape, the stator core L will be described here as a typical one. FIGS. 23A and 23B are respectively a perspective view and a front view showing the stator core L according to the sixth embodiment. A key groove 12 is formed in the outer surface of the stator core L to extend in the rotation axis direction. In the sixth embodiment, if the stator core UL is a reference, UL=UR=0, VL=VR=5 and WL=WR=10. The rotation direction phase angles of the stator cores 309a, 309b and 309c can be set using key members 313a, 313b and 313c.

As described above, the electrical machine according to the sixth embodiment has no stage skew and thus decreases the number of parts and improves assemblability, as compared with the first to fifth embodiments, with the result that it is effective in lowering manufacturing costs. The sixth embodiment is effective in applying to a low-cost electrical machine that allows a torque ripple.

According to at least one of the foregoing embodiments, a key groove is formed as a positioning part in a teeth portion (e.g., the stator core L shown in FIG. 22) and an exterior portion (e.g., the stator core 309a shown in FIG. 22), and a key member is fitted into the key groove to form a relative rotation direction phase angle of the teeth portion. Thus, commonality of the parts (teeth portions) can be allowed, with the result that the type of pressing die required for manufacturing can be minimized and the manufacturing costs can be lowered.

Figure 24A:
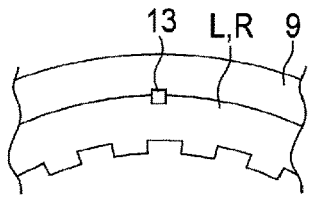
FIGS. 24A, 24B, 24C, 24D, 24E, 24F, 24G, 24H, 24I, 24J, 24K and 24L are views showing examples of a positioning structure according to the first to sixth embodiments.
Figure 24F:
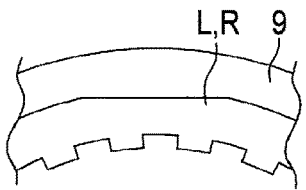
Figure 24K:
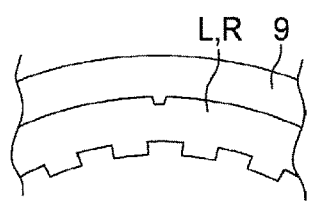
Figure 24B:
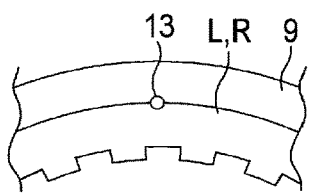
Figure 24G:
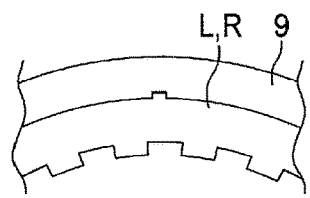
Figure 24L:
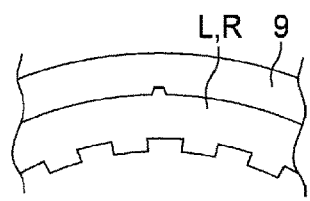

The method for positioning a teeth portion in an exterior portion is not limited to the above-described example. Examples of the positioning method will be described with reference to FIGS. 24A to 24L. In FIGS. 24A, 24B, 24D and 24E, a key groove (also called a recess) is formed in the stator core (teeth portion) L and the stator core (exterior portion) 9 to extend in the rotation axis direction, and the positioning is performed using a key member 13. FIG. 24A shows a positioning method employed in the foregoing embodiments. The key member 13 is a member having a rectangular or square section. The key member 13 may have a circular section as shown in FIG. 24B, a triangular section as shown in FIG. 24D and a rhombic section as shown in FIG. 24E.

Figure 24C:
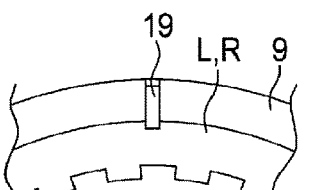
Figure 24H:
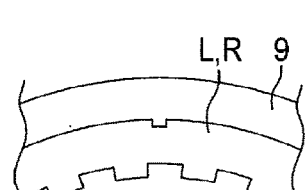
Figure 24D:
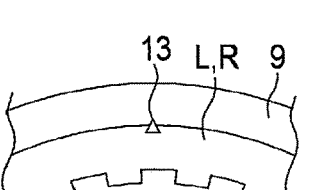
Figure 24I:
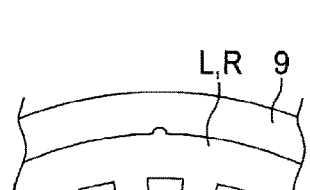
Figure 24E:
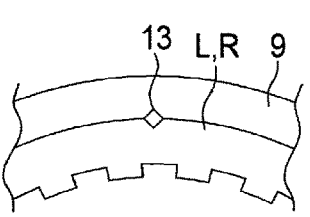
Figure 24J:
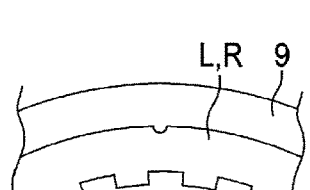

FIG. 24C shows a positioning method performed by inserting a pin 19 into a through hole formed in the exterior portion 9 from the radial direction and fitting the pin 19 in the recess of the teeth portion L. FIG. 24F shows a positioning method using a cut face of the teeth portion L and a cut face of the exterior portion 9. FIGS. 24G to 24L each show an example of a positioning method using a projection and a recess engaged with the projection. In FIG. 24G, a projection is formed on the teeth portion L to extend in the rotation axis direction and a recess is formed in the exterior portion 9 to extend in the rotation axis direction. For example, the projection and recess have a rectangular section. The projection and recess may have a semi-circular section as shown in FIG. 24I and substantially a trapezoidal section as shown in FIG. 24L. When a plurality of projections are formed on the teeth portion L, a plurality of recesses need to be formed in the exterior portion 9. In FIG. 24H, a recess is formed in the teeth portion L to extend in the rotation axis direction and a projection is formed on the exterior portion 9 in the rotation axis direction. For example, the projection and recess have a rectangular section. The projection and recess may have a semi-circular section as shown in FIG. 24J and a substantially trapezoidal section as shown in FIG. 24K.

As described above, a positioning structure for a rotation direction phase angle can be achieved using a key, a pin, a recess, a projection, a cut face or the like. In the actual equipment design, the optimum structure can be selected as appropriate.

Furthermore, the electrical machines according to the foregoing embodiments are not limited to an inner rotor in which a rotor is located inside an armature, and can be applied to an outer rotor in which a rotor is located outside an armature.

In the following seventh to ninth embodiments, examples of use of the electrical machines according to the foregoing embodiments will be described.

Seventh Embodiment

Figure 25:
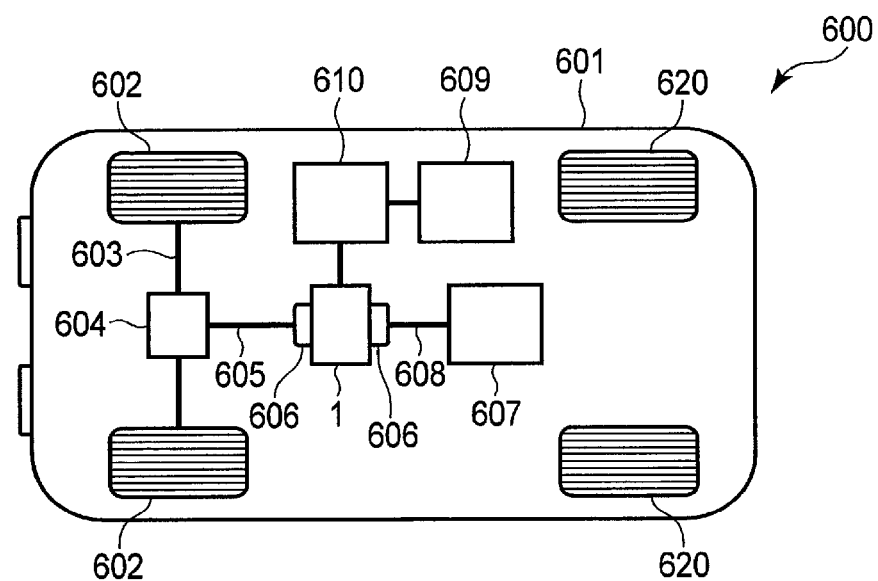
FIG. 25 is a view showing a vehicle according to a seventh embodiment.

FIG. 25 schematically shows an electric-powered vehicle 600 according to a seventh embodiment. The electric-powered vehicle 600 includes any one of the electrical machines according to the first to sixth embodiments or its modification. The electric-powered vehicle 600 shown in FIG. 25 includes the electrical machine 1 according to the first embodiment. The electric-powered vehicle 600 is what is called a hybrid electric vehicle (HEV). The electric-powered vehicle 600 includes a car body 601 that is supported by two front wheels 602 and two rear wheels 620. The front wheels 602 are connected to the electrical machine 1 via a drive shaft 603, a differential gear 604 and a drive shaft 605. The drive shaft 605 is coupled to the rotor unit 2 (not shown in FIG. 25) of the electrical machine 1. The rotor unit 2 is rotatably supported by bearings 606 disposed on both sides of the electrical machine 1. The bearings 606 and the bearings 21a and 21b of the electrical machine 1 can be the same or different. The electric-powered vehicle 600 further includes an engine 607, and the engine 607 is coupled to a rotor unit 2 via a coupling shaft 608. Thus, the torque of the engine 607 and that of the electrical machine 1 are both transmitted to the front wheels 602 to serve as a driving force to drive the car body 601.

Figure 26:
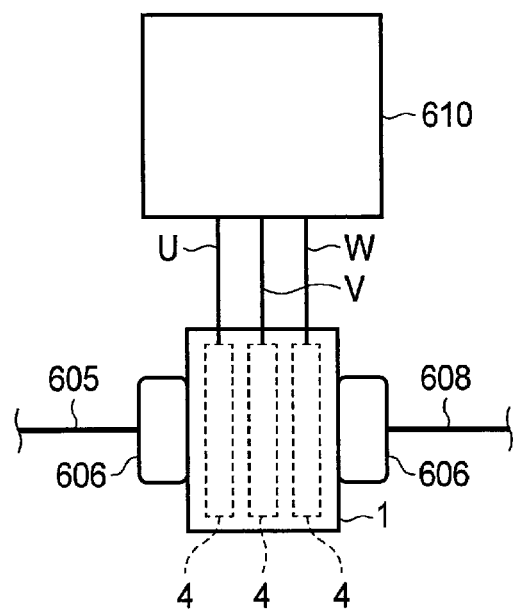
FIG. 26 is an enlarged view of part of the vehicle shown in FIG. 25.

FIG. 26 is an enlarged view showing part of the electric-powered vehicle 600 including the electrical machine 1 in detail. As shown in FIG. 26, U-phase, V-phase and W-phase output power lines of a controller 610 which is operated by a battery 9 as a power supply, are connected to the armature coil 10 (not shown in FIG. 26) of the electrical machine 1. Currents of three phases with a 120-degree phase difference therebetween are applied to the armature coil 10 of the electrical machine 1. The controller 610 controls the electrical machine 1 to operate it as a generator by collecting regeneration energy generated when the car body 601 shifts from its running state to a stopping state.

The electric-powered vehicle is not limited to an HEV as shown in FIG. 26, and may be an electric vehicle (EV).

Eighth Embodiment

FIG. 27 schematically shows a wind power generation apparatus 700 according to an eighth embodiment. The wind power generation apparatus 700 includes any one of the electrical machines according to the first to sixth embodiments or its modification. The wind power generation apparatus 700 shown in FIG. 27 includes the electrical machine 1 according to the first embodiment. The wind power generation apparatus 700 includes a blade 701 that is rotated by wind power to transmit torque to a speed-up gear 703 via a rotating shaft 702. The output torque of the speed-up gear 703 is transmitted to the rotor unit 2 (not shown in FIG. 27) of the rotating electric machine 1 via a rotating shaft 704 and a shaft joint 705, and the rotating electric machine 1 generates power. The generated power is applied to a power system 708 via a transformer 706 and a system protection unit 707.

A main rotary part including the speed-up gear 703 and the rotating electric machine 1 is stored in a machine room that is called a nacelle 709. The nacelle 709 is so supported by a tower 710 that the blade 701 is located at such a height as to obtain wind power with efficiency. The tower 710 is fixed to a base 711 provided on the ground or on a floating body in the ocean.

The rotating electric machines according to the embodiments are not limited to a case of being used in a wind power generation apparatus, and can be used in all types of power generation apparatus such as a hydroelectric generation apparatus.

Ninth Embodiment

FIG. 28 schematically shows a rope type elevator apparatus 800 according to a ninth embodiment. The elevator apparatus 800 includes any one of the electrical machines according to the first to sixth embodiments or its modification. The elevator apparatus 800 shown in FIG. 28 includes the electrical machine 1 according to the first embodiment.

The elevator apparatus 800 includes a hoisting machine 801, a car 802, a counter weight 803 and a rope 804, which are disposed in a hoistway 807. The hoisting machine 801 includes the electrical machine 1 and a sheave. The rope 804 is put on a pulley 805 of the car 802, the hoisting machine 801, and a pulley 806 of the counter weight 803. One end of the rope 804 is fixed to a predetermined position A of a building or the like, while the other end thereof is fixed to a predetermined position B of a building or the like. When the hoisting machine 801 is operated by a controller (not shown), the sheave is rotated by torque generated from the electrical machine 1. The hoisting machine 801 is able to lift or lower the car 802 by winding up or winding down the rope 804 by a friction force between the sheave and the rope 804.

In the seventh to ninth embodiments, the electrical machines according to the first to sixth embodiments are applied to an electric-powered vehicle, a power generation apparatus and an elevator apparatus as described above. However, the electrical machines are not limited to them, and can be applied to other devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrical machine comprising:
a rotor; and
an armature including a first stator core, a second stator core, a third stator core, and an armature coil which are annular in shape, the first stator core and the second stator core being arranged along a direction of a rotation axis of the rotor, the third stator core facing the first stator core and the second stator core, the armature coil being provided between the first stator core and the second stator core, wherein the first stator core and the second stator core have a same shape, and each include a plurality of magnetic poles arranged in a rotation direction and a plurality of first positioning parts facing the third stator core, the third stator core includes a second positioning part facing the first stator core and the second stator core, and the first stator core and the second stator core are positioned to the third stator core with the first stator core being relatively shifted to the second stator core in the rotation direction by a predetermined angle by using a single first positioning part selected from the first positioning parts of the first stator core, a single first positioning part selected from the first positioning parts of the second stator core, and the second positioning part of the third stator core.

2. The electrical machine according to claim 1, wherein each of the first positioning parts is one of a recess, a projection and a cut face, and the second positioning part is one of a recess and a projection when the first positioning part is the recess, the second positioning part is a recess when the first positioning part is the projection, and the second positioning part is a cut face when the first positioning part is the cut face.

3. The electrical machine according to claim 1, further comprising a member, wherein each of the first positioning parts is a recess, the second positioning part is a recess, and the member is fitted into a space defined by the recess of the first positioning part selected from the first positioning parts of the first stator core and the recess of the second positioning part of the third stator core and a space defined by the recess of the first positioning part selected from the first positioning parts of the second stator core and the recess of the second positioning part of the third stator core.

4. A hoisting machine comprising the electrical machine according to claim 1.

5. The electrical machine according to claim 1, wherein the first stator core comprises a first sub-core and a second sub-core and has a stage skew structure, the second stator core comprises a third sub-core and a fourth sub-core and has a stage skew structure, and a difference in phase between the first sub-core and the second sub-core is equal to a difference in phase between the third sub-core and the fourth sub-core.

6. The electrical machine according to claim 5, wherein a difference in phase between the first sub-core and the third sub-core is equal to the difference in phase between the first sub-core and the second sub-core.

7. The electrical machine according to claim 1, further comprising:

a plurality of basic units each including the rotor and the armature, the basic units being arranged along the direction of the rotation axis, the basic units having a predetermined relative phase angle around the rotation axis, wherein the third stator core is a member common to the basic units; and a single key member, wherein the first positioning parts are recesses, the second positioning part is a recess, and the first stator core and the second stator core are positioned to the third stator core with the first stator core being relatively shifted to the second stator core in the rotation direction by the predetermined angle with the single key member being fitted into a space formed by the single first positioning part selected from the first positioning parts of the first stator core, the single first positioning part selected from the first positioning parts of the second stator core, and the second positioning part of the third stator core.

8. The electrical machine according to claim 1, further comprising a plurality of basic units each including the rotor and the armature, the basic units being arranged along the direction of the rotation axis, the basic units having a predetermined relative phase angle around the rotation axis, wherein the third stator core is a member common to the basic units, and wherein the first positioning parts are recesses, the second positioning part is a projection, and the first stator core and the second stator core are positioned to the third stator core with the first stator core being relatively shifted to the second stator core in the rotation direction by the predetermined angle with the single first positioning part selected from the first positioning parts of the first stator core and the single first positioning part selected from the first positioning parts of the second stator core being engaged with the second positioning part of the third stator core.

9. The electrical machine according to claim 1, further comprising:

a plurality of basic units each including the rotor and the armature, the basic units being arranged along the direction of the rotation axis, the basic units having a predetermined relative phase angle around the rotation axis;

a plurality of key members corresponding to the basic units, wherein the first positioning parts are recesses, the second positioning part is a recess, and in each of the basic units, the first stator core and the second stator core are positioned to the third stator core with the first stator core being relatively shifted to the second stator core in the rotation direction by the predetermined angle with a corresponding one of the key members being fitted into a space formed by the single first positioning part selected from the first positioning parts of the first stator core, the single first positioning part selected from the first positioning parts of the second stator core, and the second positioning part of the third stator core.

10. The electrical machine according to claim 1, further comprising a plurality of basic units each including the rotor and the armature, the basic units being arranged along the direction of the rotation axis, the basic units having a predetermined relative phase angle around the rotation axis;

wherein the first positioning parts are recesses, the second positioning part is a projection, and in each of the basic units, the first stator core and the second stator core are positioned to the third stator core with the first stator core being relatively shifted to the second stator core in the rotation direction by the predetermined angle with the single first positioning part selected from the first positioning parts of the first stator core and the single first positioning part selected from the first positioning parts of the second stator core being engaged with the second positioning part of the third stator core.

11. An electrical machine comprising:

a rotor; and an armature including a plurality of first stator cores, a plurality of second stator cores, a third stator core, and an armature coil which are annular in shape, the first stator cores and the second stator cores being arranged along a direction of a rotation axis of the rotor, the first stator cores being provided to form a stage skew structure, the second stator cores being provided to form a stage skew structure, the third stator core facing the first stator cores and the second stator cores, the armature coil being arranged between a set of the first stator cores and a set of the second stator cores, wherein the first stator cores and the second stator cores have a same shape and each include a plurality of magnetic poles arranged in a rotation direction and a plurality of first positioning parts facing the third stator core, the third stator core includes a second positioning part facing the first stator cores and the second stator cores, the first stator cores are positioned to the third stator core by using a single first positioning part selected from the first positioning parts of each of the first stator cores and the second positioning part of the third stator core, and the second stator cores are positioned to the third stator core by using a single first positioning part selected from the first positioning parts of each of the second stator cores and the second positioning part of the third stator core.

12. The electrical machine according to claim 11, comprising a plurality of basic units each including the rotor and the armature and arranged along the direction of the rotation axis, wherein the first positioning parts and the second positioning part are used to set the relative phase angles of the first stator cores and the second stator cores in the rotation direction and relative phase angles of armatures of the basic units in the rotation direction.

13. The electrical machine according to claim 11, wherein each of the first positioning parts is one of a recess, a projection and a cut face, and the second positioning part is one of a recess and a projection when the first positioning part is the recess, the second positioning part is a recess when the first positioning part is the projection, and the second positioning part is a cut face when the first positioning part is the cut face.

14. The electrical machine according to claim 11, further comprising a member, wherein each of the first positioning parts is a recess, the second positioning part is a recess, and the member is fitted into a space defined by the recess of the first positioning part selected from the first positioning parts of each of the first stator cores and the recess of the second positioning part of the third stator core and a space defined by the recess of the first positioning part selected from the first positioning parts of each of the second stator cores and the recess of the second positioning part of the third stator core.

15. A hoisting machine comprising the electrical machine according to claim 11.

16. The electrical machine according to claim 11, wherein a difference in phase between any adjacent two of the first stator cores is not zero, and is equal to a difference in phase between any adjacent two of the second stator cores.

17. The electrical machine according to claim 11, further comprising:

a plurality of basic units each including the rotor and the armature, the basic units being arranged along the direction of the rotation axis, the basic units having a predetermined relative phase angle around the rotation axis, wherein the third stator core is a member common to the basic units;

a single key member, wherein the first positioning parts are recesses, the second positioning part is a recess, the first stator cores and the second stator cores are positioned to the third stator core with the single key member being fitted into a space formed by the single first positioning part selected from the first positioning parts of each of the first stator cores, the single first positioning part selected from the first positioning parts of each of the second stator cores, and the second positioning part of the third stator core.

18. The electrical machine according to claim 11, further comprising a plurality of basic units each including the rotor and the armature, the basic units being arranged along the direction of the rotation axis, the basic units having a predetermined relative phase angle around the rotation axis, wherein the third stator core is a member common to the basic units, and wherein the first positioning parts are recesses, the second positioning part is a projection, the first stator cores and the second stator cores are positioned to the third stator core with the single first positioning part selected from the first positioning parts of each of the first stator cores and the single first positioning part selected from the first positioning parts of each of the second stator cores being engaged with the second positioning part of the third stator core.

19. The electrical machine according to claim 11, further comprising:

a plurality of basic units each including the rotor and the armature, the basic units being arranged along the direction of the rotation axis, the basic units having a predetermined relative phase angle around the rotation axis;

a plurality of key members corresponding to the basic units, wherein the first positioning parts are recesses, the second positioning part is a recess, and in each of the basic units, the first stator cores and the second stator cores are positioned to the third stator core with a corresponding one of the key members being fitted into a space formed by the single first positioning part selected from the first positioning parts of each of the first stator cores, the single first positioning part selected from the first positioning parts of each of the second stator cores, and the second positioning part of the third stator core.

20. The electrical machine according to claim 11, further comprising a plurality of basic units each including the rotor and the armature, the basic units being arranged along the direction of the rotation axis, the basic units having a predetermined relative phase angle around the rotation axis, wherein the first positioning parts are recesses, the second positioning part is a projection, and in each of the basic units, the first stator cores and the second stator cores are positioned to the third stator core with a corresponding one of the key members being fitted into a space formed by the single first positioning part selected from the first positioning parts of each of the first stator cores, the single first positioning part selected from the first positioning parts of each of the second stator cores, and the second positioning part of the third stator core.

* * * * *